United States Patent
Nishida

(10) Patent No.: US 7,330,600 B2
(45) Date of Patent: Feb. 12, 2008

(54) IMAGE PROCESSING DEVICE ESTIMATING BLACK CHARACTER COLOR AND GROUND COLOR ACCORDING TO CHARACTER-AREA PIXELS CLASSIFIED INTO TWO CLASSES

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 801 days.

(21) Appl. No.: 10/649,901

(22) Filed: Aug. 28, 2003

(65) Prior Publication Data
US 2004/0076337 A1    Apr. 22, 2004

(30) Foreign Application Priority Data

| | | | |
|---|---|---|---|
| Sep. 5, 2002 | (JP) | | 2002-259618 |
| Sep. 26, 2002 | (JP) | | 2002-280789 |
| Feb. 26, 2003 | (JP) | | 2003-048834 |
| Jun. 9, 2003 | (JP) | | 2003-163565 |

(51) Int. Cl.
*G06K 9/40* (2006.01)
(52) U.S. Cl. ............. 382/274; 382/187; 382/190; 382/282; 358/462; 358/466; 345/640; 348/586
(58) Field of Classification Search ................ 382/177, 382/190, 266, 274, 275, 187, 282; 348/586, 348/603; 358/462, 466; 345/640
See application file for complete search history.

(56) References Cited

U.S. PATENT DOCUMENTS

| | | | |
|---|---|---|---|
| 5,067,165 A | 11/1991 | Nishida | |
| 5,204,915 A | 4/1993 | Nishida | |
| 5,266,805 A * | 11/1993 | Edgar | 250/330 |
| 5,313,528 A | 5/1994 | Nishida | |
| 5,317,649 A | 5/1994 | Nishida | |
| 5,497,432 A | 3/1996 | Nishida | |
| 5,502,776 A * | 3/1996 | Manabe | 382/172 |
| 5,572,602 A * | 11/1996 | Naoi et al. | 382/178 |
| 5,581,633 A * | 12/1996 | Hotta et al. | 382/171 |
| 5,630,037 A * | 5/1997 | Schindler | 345/592 |
| 5,889,885 A * | 3/1999 | Moed et al. | 382/172 |
| 6,021,011 A * | 2/2000 | Behrens et al. | 360/51 |
| 6,041,138 A | 3/2000 | Nishida | |
| 6,285,349 B1 * | 9/2001 | Smith | 345/690 |
| 6,345,130 B1 * | 2/2002 | Dahl | 382/286 |
| 6,424,746 B1 | 7/2002 | Nishida | |

(Continued)

FOREIGN PATENT DOCUMENTS

| | | |
|---|---|---|
| JP | 3-274862 | 12/1991 |
| JP | 5-14724 | 1/1993 |
| JP | 05-316343 | 11/1993 |
| JP | 06-339028 | 12/1994 |
| JP | 2002-117400 | 12/1994 |

(Continued)

*Primary Examiner*—Yosef Kassa
(74) *Attorney, Agent, or Firm*—Dickstein Shapiro LLP

(57) ABSTRACT

A character area is extracted from an original image, which is a digital image, according to a feature value calculated with respect to the original image. Pixels belonging to the extracted character area are classified into a first class and a second class according to colors, in each of blocks divided from the original image. A black character color and a ground color on the original image are estimated according to the classification of the pixels belonging to the extracted character area into the first and second classes. A tone correction is performed to the original image according to the estimated black character color and the estimated ground color so as to adjust a contrast of the black character and the ground in an output image.

52 Claims, 13 Drawing Sheets

U.S. PATENT DOCUMENTS

| | | | |
|---|---|---|---|
| 6,493,878 B1 * | 12/2002 | Kassatly | 725/144 |
| 6,675,125 B2 * | 1/2004 | Bizjak | 702/179 |
| 2002/0071131 A1 | 6/2002 | Nishida | |
| 2003/0179409 A1 | 9/2003 | Nishida | |

FOREIGN PATENT DOCUMENTS

| | | |
|---|---|---|
| JP | 08-307666 | 11/1996 |
| JP | 10-232926 | 9/1998 |
| JP | 10-283470 | 10/1998 |
| JP | 11-136505 | 5/1999 |
| JP | 11-220631 | 8/1999 |
| JP | 200-13625 | 1/2000 |
| JP | 2000-13616 | 1/2000 |
| JP | 2000-22971 | 1/2000 |
| JP | 2000-48120 | 2/2000 |
| JP | 2000-50083 | 2/2000 |
| JP | 2000-78408 | 3/2000 |
| JP | 200-115538 | 4/2000 |
| JP | 2000-196871 | 7/2000 |
| JP | 2000-242777 | 9/2000 |
| JP | 2000-316097 | 11/2000 |
| JP | 2000-357226 | 12/2000 |
| JP | 2001-36748 | 2/2001 |
| JP | 2001-45297 | 2/2001 |
| JP | 2001-45303 | 2/2001 |
| JP | 2001-78036 | 3/2001 |
| JP | 2001-144962 | 5/2001 |
| JP | 2001-148785 | 5/2001 |
| JP | 2001-167260 | 6/2001 |
| JP | 2001-169133 | 6/2001 |
| JP | 2001-189862 | 7/2001 |
| JP | 2001-189863 | 7/2001 |
| JP | 2001-197312 | 7/2001 |
| JP | 2001-222711 | 8/2001 |
| JP | 2002-117400 | 4/2002 |
| JP | 2002-118751 | 4/2002 |

* cited by examiner

IMAGE PROCESSING DEVICE ESTIMATING BLACK CHARACTER COLOR AND GROUND COLOR ACCORDING TO CHARACTER-AREA PIXELS CLASSIFIED INTO TWO CLASSES

BACKGROUND OF THE INVENTION

1. Field of the Invention

The present invention generally relates to an image processing device, an image processing program, and a storage medium, and more particularly, to an image processing device and an image processing program which can adjust a contrast of a black character and a ground in an output image, and a storage medium storing the image processing program.

2. Description of the Related Art

For example, when an image output apparatus deals with an image (a document image) obtained by an image input apparatus, such as a scanner, scanning a printed document intended to communicate contents thereof, the document image is also intended to communicate contents thereof. Therefore, enhancing readability of a text in the output document image is a most important concern upon outputting the document image.

However, for example, when a color image output apparatus, such as a color printer, prints a digital image obtained by using a color image input apparatus, such as a color scanner, to input a document printed with a white ground, printing the image without applying any image processing thereto may cause problems of lowering a contrast between a character and the ground, or coloring a black character or the ground which should originally be black or white, thereby decreasing readability of the text.

These problems occur because colors and gradations are not coordinated between the image input apparatus and the image output apparatus. When image-processing apparatuses, such as the image input apparatus and the image output apparatus, are stand-alone, image-processing algorithms and parameters are often designed according to characteristics of individual apparatuses.

There is a related technology, for example, in which not only a process of emphasizing a pixel corresponding to a black character used in a copier, etc. (for example, disclosed in Japanese Patent No. 2558915 (Japanese Laid-Open Patent Application No. 3-274862), Japanese Laid-Open Patent Application No. 2000-196871, Japanese Laid-Open Patent Application No. 2000-316097, Japanese Laid-Open Patent Application No. 2001-078036, and Japanese Laid-Open Patent Application No. 2001-169133), and a process of specifying a middle-tone area (for example, disclosed in Japanese Patent No. 3158498 (Japanese Laid-Open Patent Application No. 5-014724), Japanese Laid-Open Patent Application No. 2001-036748, Japanese Laid-Open Patent Application No. 2001-144962, and Japanese Laid-Open Patent Application No. 11-220631) are performed, but also a process of performing a tone correction according to a histogram of a pixel signal value (for example, disclosed in Japanese Laid-Open Patent Application No. 2000-013616, Japanese Laid-Open Patent Application No. 2000-013625, Japanese Laid-Open Patent Application No. 2000-115538, Japanese Laid-Open Patent Application No. 2000-242777, Japanese Laid-Open Patent Application No. 2001-045303, Japanese Laid-Open Patent Application No. 2001-148785, Japanese Laid-Open Patent Application No. 2001-167260, Japanese Laid-Open Patent Application No. 2001-189862, Japanese Laid-Open Patent Application No. 2001-189863, Japanese Laid-Open Patent Application No. 2001-197312, Japanese Laid-Open Patent Application No. 2001-222711, and Japanese Laid-Open Patent Application No. 10-283470) is performed. In such a technology, image-processing algorithms and parameters usually depend greatly on color characteristics, resolutions, and frequency characteristics of the input apparatus.

Besides, when a digital image obtained by inputting a printed document from a color image apparatus, such as a scanner, is printed from a color printer, or is displayed on a display, without applying any image processing thereto, this may cause a problematic phenomenon of a non-uniform color of a ground or a background, depending on different characteristics of the scanner (i.e., difference in reading conditions) upon inputting the printed document, or may cause a problematic phenomenon of a so-called "show-through effect" in which contents printed on a backside of the printed document are transparently input. In such cases, the image as a whole often appears uncleanly.

For solving the above-mentioned problematic phenomena in a case where the color of the ground or the background of the subject digital image is white, it is effective to perform a process referred to as "ground removal" or "ground-color removal" which replaces portions of the ground or the background with white.

Well-known examples of the process referred to as "ground removal" or "ground-color removal" include a process of detecting a ground level according to a histogram of a pixel signal value, and thereby removing a ground (for example, disclosed in Japanese Laid-Open Patent Application No. 2000-022971 and Japanese Laid-Open Patent Application No. 2000-078408). When the color of the ground or the background is white, such processing prevents an image deterioration resulting from different characteristics of the scanner (i.e., difference in reading conditions) or from a "show-through effect".

Besides, there is a process of estimating a background color of a document, and using a difference between the background color and a pixel value of a targeted pixel to change the pixel value of the targeted pixel (for example, disclosed in Japanese Laid-Open Patent Application No. 2000-050083). In this process, a background color is determined by finding a brightest area from histograms of a same color; a background reference color is determined from a color distribution according to a result of discrimination of either of the following four patterns as a background color; and a color of each pixel is adjusted according to a difference between the above-determined reference color and the pixel. In this technology, the four patterns discriminated as a background color are: (1) nearwhite, contone (white-ground copy paper, newspaper printing paper, etc.), (2) near-white, halftone (magazine printing paper etc.), (3) far-white, contone (photograph, colored paper, etc.), and (4) a far-white, halftone (magazine printing paper etc.).

Besides, there is a technology in which a threshold value for judging an area to be either an image area, a ground area or other area is determined by analyzing a distribution state of peaks with respect to a histogram of a gradation distribution; accordingly, an image area is output without any processing, a ground area is converted into a ground color, and the other area is processed according to predetermined conditions, thereby preventing an image deterioration (for example, disclosed in Japanese Laid-Open Patent Application No. 2001-045297).

By the way, the recent spread of network environments has caused circumstances in which an image input via an image apparatus is transmitted to a remote place via a network, and a receiver edits, reuses, prints and/or retransmits the image on a PC (personal computer). In such a network environment, processings, such as edition, reuse, printing, and retransmission are performed to an image input via an unknown image apparatus; this involves new technical problems not considered in the conventional technology as disclose in the above-mentioned Japanese Laid-Open Patent Application documents.

That is, in a network environment, input/output apparatuses have various characteristics; further, when a digital image is input and transmitted from a remote place, an input apparatus is sometimes unknown. In addition, an image-processing system optimal for a certain specific model may not necessarily operate effectively to a model having different characteristics. Therefore, when an image input by an image input apparatus is output by an image output apparatus, precision in recognizing an image may vary, thereby deteriorating a quality of an output image, and decreasing a readability of a text in the output image.

As a countermeasure therefor, an adaptive binarization is effective, as long as problems of the contrast between a character and a ground and coloring of a black character and a ground are concerned. Research and development of binarization technology have been well conducted as a function of preprocessing for an OCR in a document image processing. However, applying a binarization causes a problem that a gradation and a color in a middle-tone area are lost.

This problem may be solved by using a technique of dividing an image into areas, such as a text, a photograph, and a line drawing, which is used in a document image recognition, so as to apply the binarization only for an area in which a black character is written on a white ground. With such a technology, even when an area is incorrectly recognized, edition and correction are easy in OCR whose output forms are text files, such as HTML. However, when a high-definition re-output of a document image is intended, edition and correction of an image may become very complicated when an area is incorrectly recognized.

This necessitates a comprehensive tone correction suitable for a document image, namely a "soft" comprehensive threshold processing, such as changing a white ground into white and changing a black character into black while maintaining a gradation of a middle-tone area. At this point, the comprehensive tone correction, i.e., the "soft" comprehensive threshold processing means a processing such as applying an identical conversion to all of pixels.

Besides, since image input apparatuses have various characteristics, hard-coding of a parameter used as a "predetermined threshold value" must be avoided, for example when performing a processing of substituting white for a color of a pixel having a saturation equal to or smaller than the predetermined threshold value, or when performing a processing of regarding a color of a pixel having a saturation equal to or smaller than the predetermined threshold value as monochrome. Preferably, the parameter (the color of a ground or a black character) determining the above-mentioned processing is calculable adaptively from an image.

Especially, image output apparatuses, such as printers, have various capabilities in representing a highlight color; there is not a uniformity; for example, a same signal is clipped to become white (not printed at all) in one case, and is printed visibly in another case. Therefore, upon the above-described image processing, it is preferred that a user can easily adjust the processing according to characteristics of the image output apparatuses.

Besides, in a color document image, a ground or a background may often have arbitrarily set colors, and a background may often have a complicated composition, including a plurality of background colors.

A histogram obtained by simply examining colors and a gradation distribution in such a color document image including a complicated background composition has a form of "mixture distribution" in which multiple peaks and valleys appear in the histogram. Therefore, it is difficult to conjecture a true background color.

The above-described technology disclosed in Japanese Laid-Open Patent Application No. 2000-022971, Japanese Laid-Open Patent Application No. 2000-078408, or Japanese Laid-Open Patent Application No. 2001-045297 refers to a method of extracting a background or a ground color from a color document image having such a "mixture distribution". However, since an actually obtained histogram also includes many peaks and valleys deriving from noises, a desired background or ground color cannot always be extracted correctly, but may often be extracted incorrectly.

Besides, in the above-described technology disclosed in Japanese Laid-Open Patent Application No. 2000-050083, a background or a ground is discriminated to be contone or halftone (dots). However, since the discrimination of the halftone dots strongly depends on a frequency characteristic (MTF) of an input apparatus, it is difficult to apply this technology when data is transmitted from a remote place via a network with an input apparatus being unknown.

SUMMARY OF THE INVENTION

It is a general object of the present invention to provide an improved and useful image processing device, an image processing program and a storage medium in which the above-mentioned problems are eliminated.

A more specific object of the present invention is to provide an image processing device and an image processing program which can not only maintain a gradation of a middle-tone area in an original image input from various image input apparatuses, but also can automatically adjust a contrast between a black character and a ground in an output image without a user performing an operation, such as setting a parameter, and to provide a storage medium storing the image processing program.

In order to achieve the above-mentioned objects, there is provided according to one aspect of the present invention an image processing device including a character area extraction part extracting a character area from an original image that is a digital image, a class classification part classifying pixels belonging to the character area into a first class and a second class according to colors, a black-character-color/ground-color estimation part estimating a black character color and a ground color on the original image according to the pixels belonging to the character area being classified into the first class and the second class, and a tone correction part performing a tone correction to the original image according to the estimated black character color and the estimated ground color.

According to the present invention, upon outputting the original image, which is a digital image input from an image input apparatus, from an image output apparatus, for example, the black character color and the ground color on the original image are estimated according to the class classification of the pixels belonging to the character area according to colors, and the tone correction can be performed to the original image according to the estimated black character color and the estimated ground color without using predetermined parameters. Therefore, while a gradation of a middle-tone area in the original image input from the various image input apparatus is maintained, a contrast between the black character and the ground in an output image can be automatically adjusted, without a user performing an operation, such as setting a parameter.

In order to achieve the above-mentioned objects, there is also provided according to another aspect of the present invention an image processing device including a character area extraction part extracting a character area from an original image that is a digital image, a class classification part classifying pixels belonging to the character area into a first class and a second class according to colors, a background color estimation part estimating a background color on the original image according to the pixels belonging to the character area being classified into the first class and the second class, a background area specification part specifying a background area on the original image according to the estimated background color, and a tone correction part performing a tone correction to the original image by replacing a color of the specified background area with the estimated background color or a white color.

According to the present invention, upon outputting the original image, which is a digital image input from an image input apparatus, from an image output apparatus, for example, the background color is estimated from original image according to the class classification of the pixels belonging to the character area according to colors, and the background area is specified according to the estimated background color; then, the color of the specified background area is replaced with the estimated background color or a white color. Thereby, the tone correction can be performed to the original image without using predetermined parameters. More specifically, an image deterioration originating from causes in a background part, such as changes of color of the background or a show-through effect, in the original image input from the various image input apparatus is corrected automatically without using predetermined parameters, or without a user performing an operation, such as setting a parameter, so that the background part is made more appropriate, thereby obtaining an output image containing easily viewable characters and so forth.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

First, a description will be given, with reference to FIG. 1 to FIG. 9, of a first embodiment according to the present invention.

Figure 1:
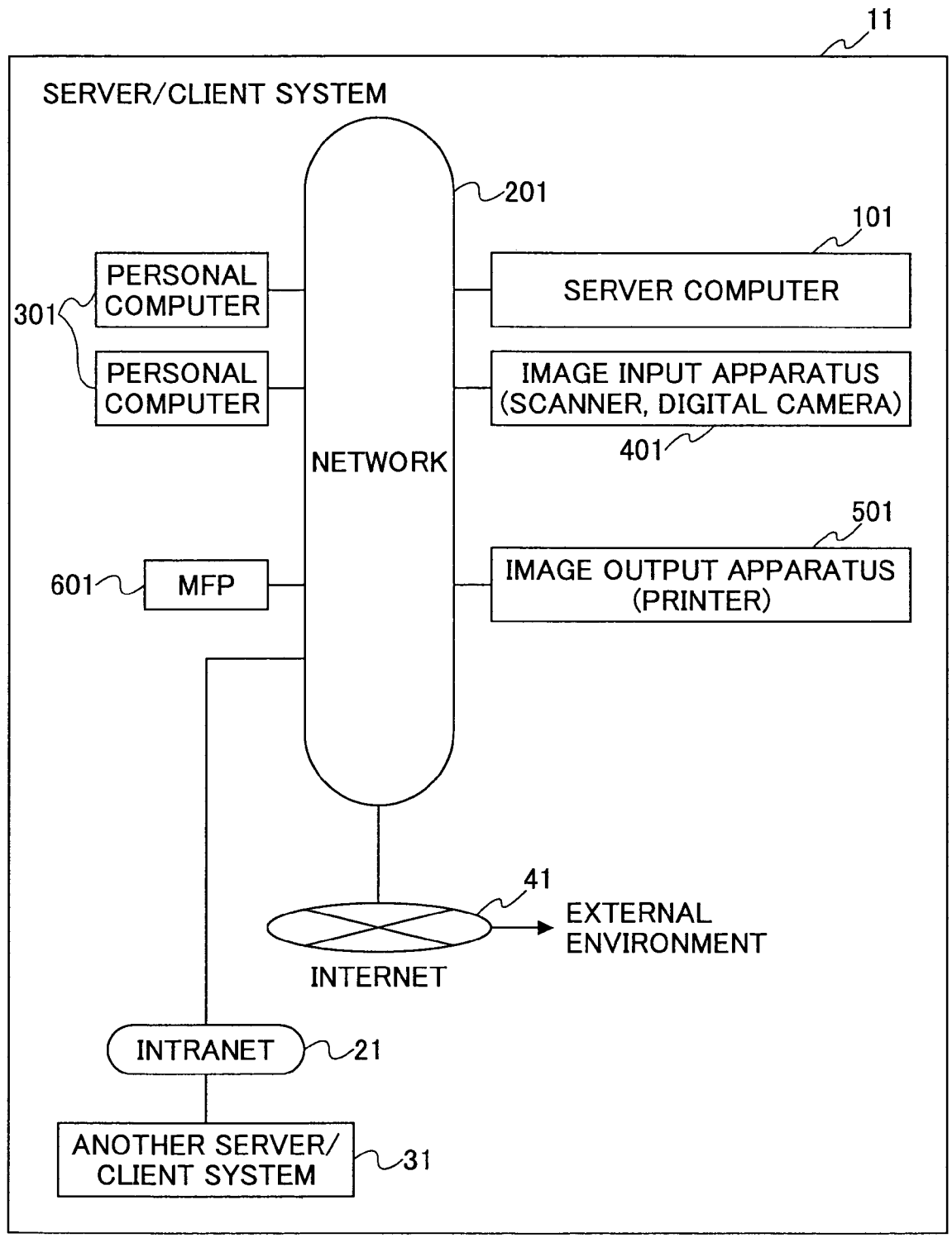
FIG. 1 is a diagram showing an example of a configuration of a system according to a first embodiment of the present invention.

FIG. 1 is a diagram showing an example of a configuration of a system according to the present embodiment. As shown in FIG. 1, in a server/client system 11 as the system according to the present embodiment, a plurality of personal computers 301 as image processing devices are connected to a server computer 101 via a network 201, such as a LAN.

The server/client system 11 is provided with an environment in which an image input apparatus 401, such as a scanner or a digital camera, and an image output apparatus 501, such as a printer, can be shared on the network 201. A multi-function peripheral (hereinafter referred to as MFP) 601 is connected to the network 201. The server/client system 11 may be provided with an environment in which the MFP 601 functions as the image input apparatus 401 or the image output apparatus 501.

The server/client system 11 is capable of communicating data with another server/client system 31 via an intranet 21, for example, and is capable of communicating data with an external environment via an Internet communication network 41.

Figure 2:
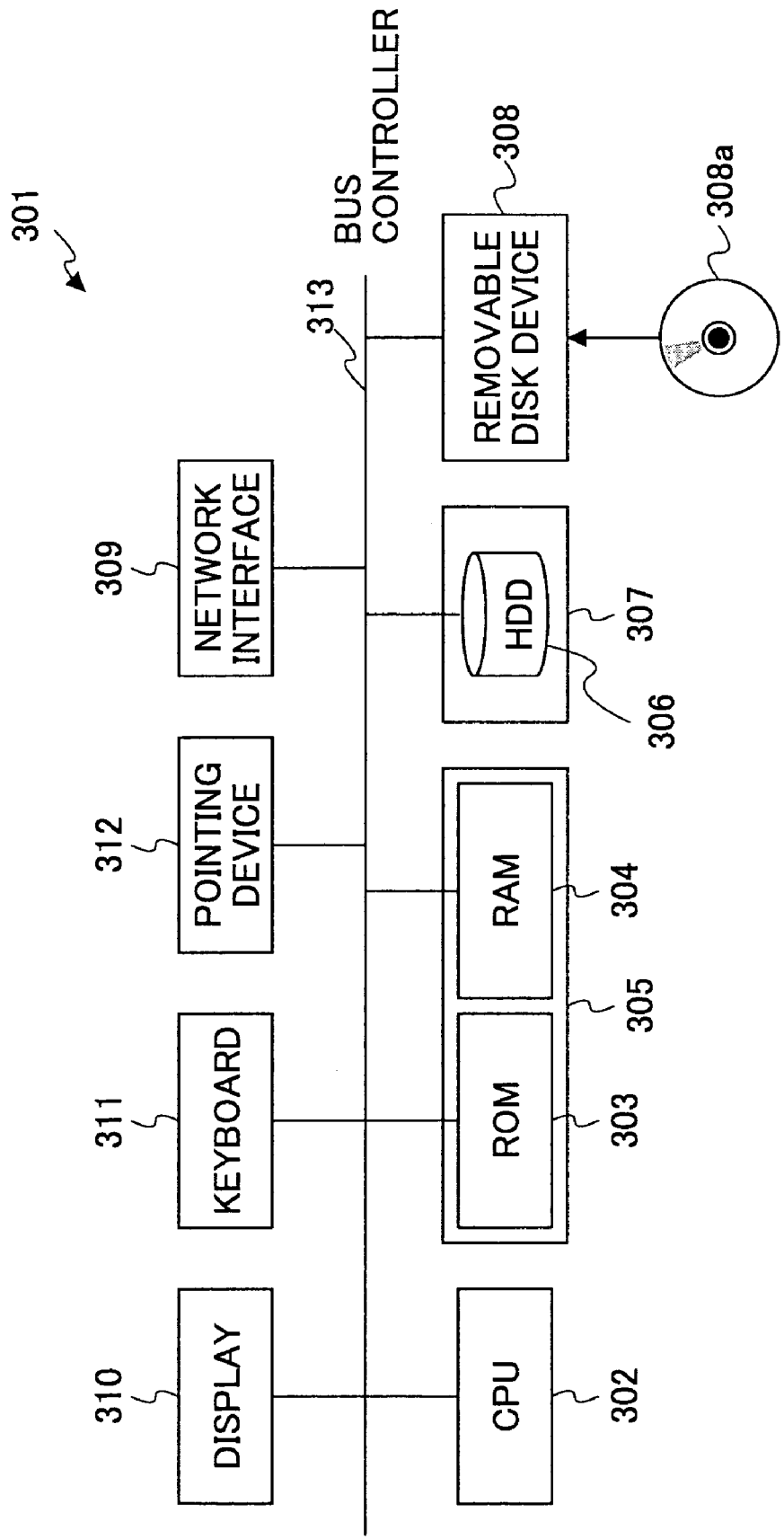
FIG. 2 is a diagram showing a module structure of a personal computer shown in FIG. 1.

Next, a description will be given, with reference to FIG. 2, of a module structure of the personal computer 301. FIG. 2 is a diagram showing the module structure of the personal computer 301 according to the present embodiment. As shown in FIG. 2, the personal computer 301 comprises a CPU 302 processing information, a primary storage 305, such as a ROM 303 and a RAM 304, storing information, a secondary storage 307, such as an HDD (hard disk drive) 306, a removable disk device 308, a network interface 309 for communicating information with other external computers, a display 310 displaying a processing progress, a processing result and so forth to an operator, a keyboard 311 for an operator to input a command, information and so forth into the personal computer 301, and a pointing device 312, such as a mouse. The removable disk device 308 reads information stored in media 308a that has a portability such as for obtaining information from outside, keeping information, and distributing information to outside.

Besides, in the present embodiment, a CD-ROM is used as the portable media 308a, and the removable disk device 308 is realized as a CD-ROM drive capable of reading information stored in the CD-ROM.

A bus controller 313 mediates transmission and reception of data among the above-described parts composing the personal computer 301 including the CPU 302, the primary storage 305, the secondary storage 307, the removable disk device 308, the network interface 309, the display 310, the keyboard 311 and the pointing device 312. Each of the above-described parts composing the personal computer 301 operates according to data and so forth mediated by the bus controller 313.

In the personal computer 301, when a user turns a power supply on, the CPU 302 starts a program referred to as a loader stored in the ROM 303, reads a program managing hardware and software of the computer from the HDD 306 to the RAM 304, and starts the read program. In the present embodiment, the program read from the HDD 306 to the RAM 304 for managing hardware and software of the computer is referred to as an operating system. According to operations performed by a user, the operating system starts an application program and so forth, reads information, and saves information. Windows (TM), UNIX (TM), and so forth are well known as representing the operating system. Besides, in the present embodiment, the application program is an operational program executed on the operating system.

The personal computer 301 according to the present embodiment stores an image processing program in the HDD 306 as an application program. Thus, in the present embodiment, a storage medium storing the image processing program is realized as the HDD 306.

Various operational programs, such as the image processing program, may be installed, for example, from optical information recording media, such as a CD-ROM, or magnetic media, such as an FD, which stores various operational programs, to the secondary storage 307, such as the HDD 306. Thus, the storage medium storing the image processing program is realized also as various portable storage media, such as the optical information recording media, such as a CD-ROM, and the magnetic media, such as an FD.

Besides, various operational programs, such as the image processing program, may be installed, for example, from outside via the network interface 309 to the secondary storage 307, such as the HDD 306.

Additionally, in the present embodiment, an image processing described hereinafter is performed according to the image processing program installed in the secondary storage 307, such as the HDD 306. However, not limited thereto, the hereinafter-described image processing may be performed according to the image processing program downloaded from outside via the network interface 309 to the secondary storage 307.

Figure 3:
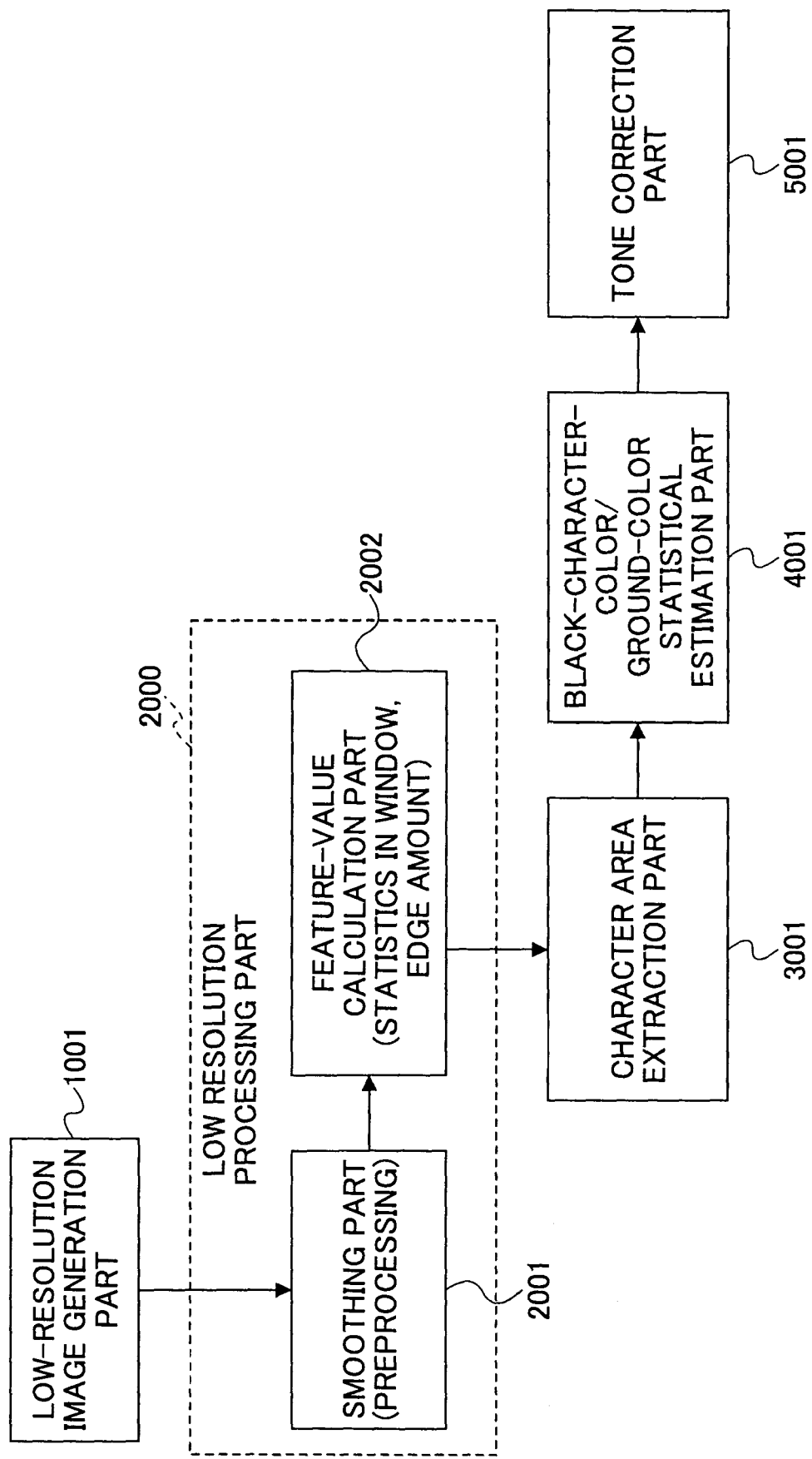
FIG. 3 is a functional block diagram illustrating parts operated by the personal computer according to an image processing program in the first embodiment of the present invention.
Figure 4:
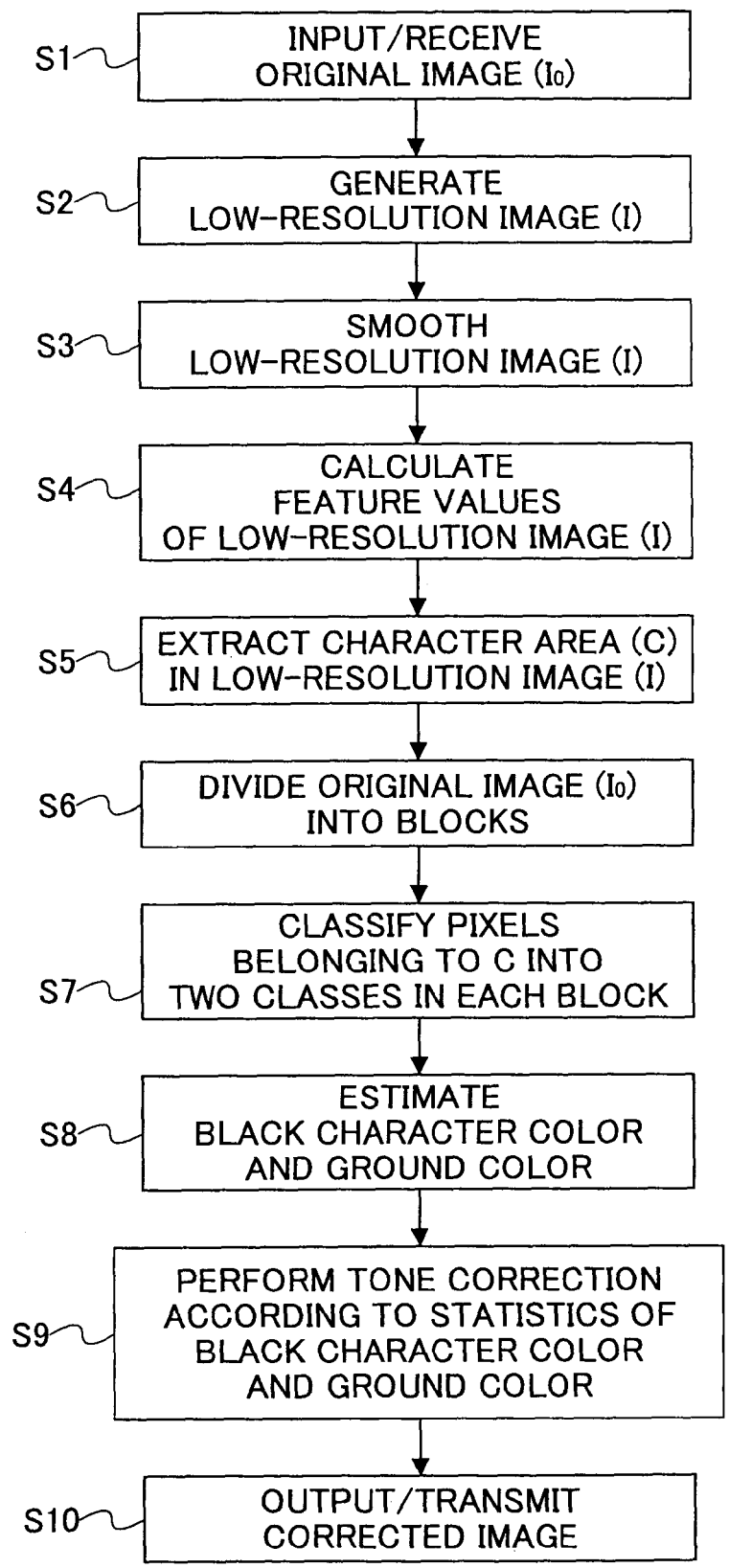
FIG. 4 is a flowchart showing a procedure of operating the parts included in the functional block diagram shown in FIG. 3.

Next, a description will be given, with reference to FIG. 3 to FIG. 8, of parts operated by the personal computer 301. FIG. 3 is a functional block diagram illustrating the parts operated by the personal computer 301 according to the image processing program. FIG. 4 is a flowchart showing a procedure of operating the parts included in the functional block diagram shown in FIG. 3.

The personal computer 301 starts the image processing program executed on the operating system, and performs various processings by the CPU 302 according to the image processing program so as to control each of the parts composing the personal computer 301 integrally. Upon executing the image processing program, the personal computer 301 performs various steps shown in the flowchart of FIG. 4 by the parts (functions) shown in the functional block diagram of FIG. 3.

<1. Outline of Processing>

First, a description will be given of an outline of the processing. Many characters are printed on a document image, and a common document includes a part in which a black character is printed directly on a space including no print. Thus, when extracting an area likely to have a black character from an input image, and dividing this input image into sufficiently small blocks, a certain block including a black character printed directly on a space assumably exists. Accordingly, supposing that a color of the space, i.e., a ground color, is white, the procedure of the image processing can be specified as follows.

As shown in the flowchart of FIG. 4, in performing the image processing program according to the present embodiment, first, the personal computer 301 receives an original image $I_0$ (input image) via the network interface 309 (step S1). In the present embodiment, the original image $I_0$ is a digitized color image, for example.

A low-resolution image generation part 1001 generates a low-resolution image (I) having a lower resolution than the original image ($I_0$) from the original image ($I_0$) (S2).

A low resolution processing part 2000 smoothes the generated low-resolution image (I) by a smoothing part 2001 (S3), and sets a window of a fixed size around each pixel of the low-resolution image (I), and calculates an average value $\mu$ and a standard deviation $\sigma$ of signals for each of channels of R, G and B by a feature-value calculation part 2002 so as to calculate feature-values of the low-resolution image (I) (S4).

A character area extraction part 3001 performs a local adaptive binarization of each color component by performing a local adaptive threshold processing and an expansion processing to the low-resolution image (I) so as to perform an extractive detection of a character area C (shown in FIG. 6) (S5).

A black-character-color/ground-color statistical estimation part 4001 divides the input original image ($I_0$) into fixed-size blocks not overlapping one another (S6), and classifies pixels belonging to the character area C into two classes, i.e., a first class and a second class, according to two representative colors in each of the divided blocks (S7). Thus, functions of a block division part and a class classification part are performed. According to brightness of the pixels belonging to the character area C, a brighter color is usually related to a background color of the character area, and a darker color is usually related to a character color.

Besides, the black-character-color/ground-color statistical estimation part 4001 selects a block B including a maximum number of pixels classified into either of the classes as a window W from the blocks in which the pixels belonging to the character area C are classified into the two classes according to the two representative colors, sets the two representative colors in the window W as an average color of a ground and an average color of black characters in the input image, respectively, and further estimates a black character color and a ground color according to statistics of the brightness (S8). Each of brightnesses is an average value of R, G and B signals obtained by an operation represented by an expression (1) below, for example. An average value and a standard deviation of the brightnesses are obtained from the brightnesses as the statistics of the brightness.

Brightness=$(r+g+b)/3$  (Expression 1)

A tone correction part 5001 performs a tone correction of each of the pixels in each of the blocks according to saturation reference values calculated from the statistics of the brightness (S9). In the present embodiment, the ground color is made white (maximum brightness), and the black character color is made black (minimum brightness).

A corrected image obtained as above is output/transmitted from the personal computer 301 via the network interface 309 and so forth (step S10).

<2. Details of Processing>

Figure 5:
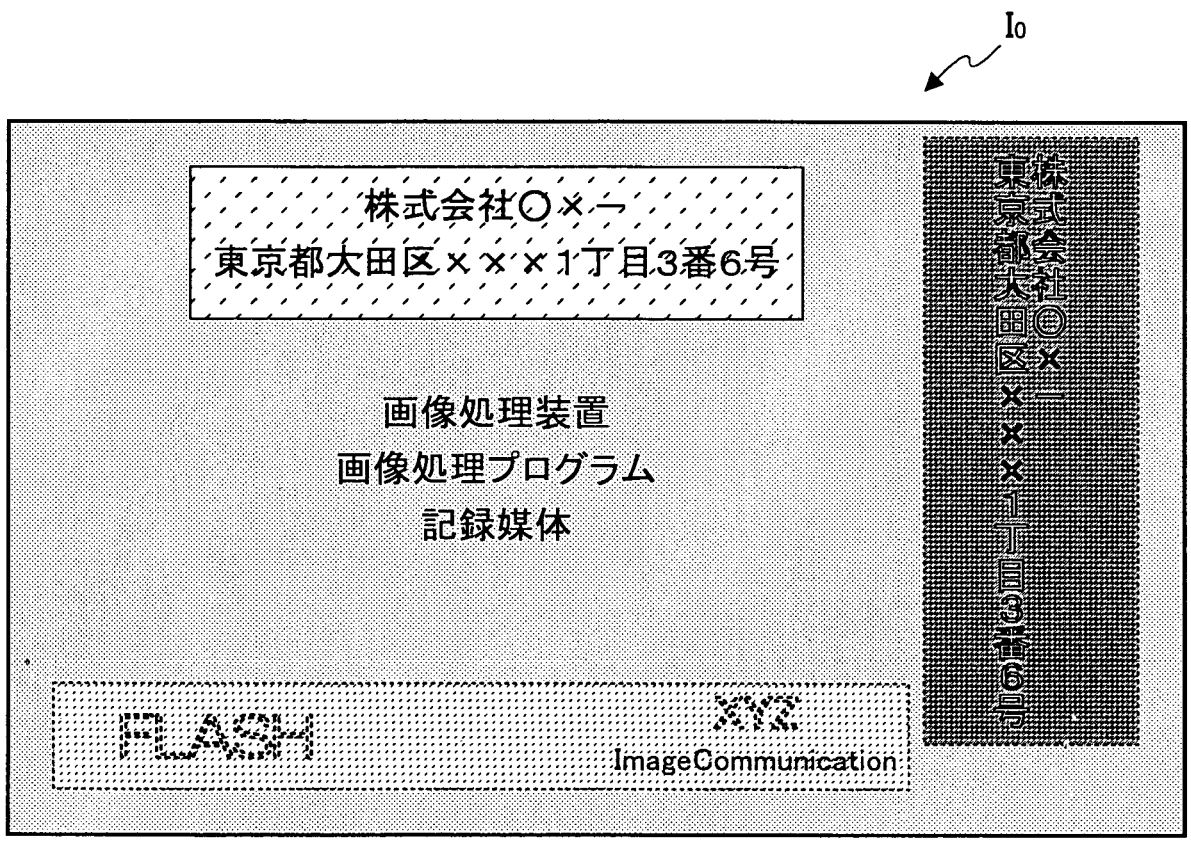
FIG. 5 shows an example of an input image in the first embodiment of the present invention.

Next, a description will be given of details of each of the above-described parts operated by the personal computer 301. FIG. 5 shows an example of the input image, i.e., the original image ($I_O$), which includes Chinese characters.

(1) Generation of Low-resolution Image (Low-resolution Image Generation Part 1001)

The low-resolution image generation part 1001 converts the original image ($I_O$) into the low-resolution image (I) of approximately 100 dpi so as to reduce an amount of calculations. First, the low-resolution image generation part 1001 simply divides the input image ($I_O$) into blocks B not overlapping one another (see FIG. 6), and sets an average value of signals in each of the blocks B as a signal of a corresponding pixel in the low-resolution image (I). In this course, supposing that a size of the block B, i.e., a reduction ratio, is r, the average value of the signals in the block B can be obtained by an operation represented by an expression (2).

$$I[i, j; k] = \sum_{m=ri}^{r(i+1)-1} \sum_{m=rj}^{r(j+1)-1} I_0[m, n; k]/(r \times r) \quad (k = R, G, B)$$ (Expression 2)

Besides, the reduction ration r is arranged to always become a natural number; when a resolution of the original image (I0) cannot be divided by 100 without leaving a remainder, the reduction ration r is rounded into a natural number. For example, when the resolution of the original image (I0) is 360 dpi, the reduction ration r is rounded into 3.

Thus, using the low-resolution image (I) having the lower resolution than the original image ($I_O$) reduces the amount of the following calculations in the image processing, thereby simplifying the processing.

(2) Smoothing (Smoothing Part 2001)

The smoothing part 2001 smoothes the low-resolution image (I) by using a linear filter so as to remove noises.

(3) Calculation of Feature Values (Feature-Value Calculation Part 2002)

The feature-value calculation part 2002 sets a window of a fixed size around each pixel of the low-resolution image (I), and calculates the average value $\mu$ and the standard deviation $\sigma$ of signals for each of channels of R, G and B.

(4) Extraction of Character Area (Character Area Extraction Part 3001)

The character area extraction part 3001 extracts the character area C by performing a local adaptive binarization of each color component with respect to the low-resolution image (I). Upon extracting the character area C, the character area extraction part 3001 compares a signal value of each pixel with a threshold value $\mu(a+b\sigma)$ having parameters a and b; then, according to whether the signal value is higher or lower than the threshold value $\mu(a+b\sigma)$, the character area extraction part 3001 extracts the character area C. For example, in an image in which a black character is printed directly on a ground, there is a tendency of a contrast becoming strong at all of the channels of R, G and B. Accordingly, in the present embodiment, a pixel (i, j) having a signal value lower than the threshold value $\mu(a+b\sigma)$ at all of the channels is set as an element of the character area C (see expression (3)).

$[i,j] \in C$ if $I[i,j;R]<(a_R+b_R \cdot \sigma_R)\mu_R \& I[i,j;G]<(a_G+b_G \cdot \sigma_G)\mu_G \& I[i,j;B]<(a_B+b_B \cdot \sigma_B)\mu_B$  (Expression 3)

Figure 6:
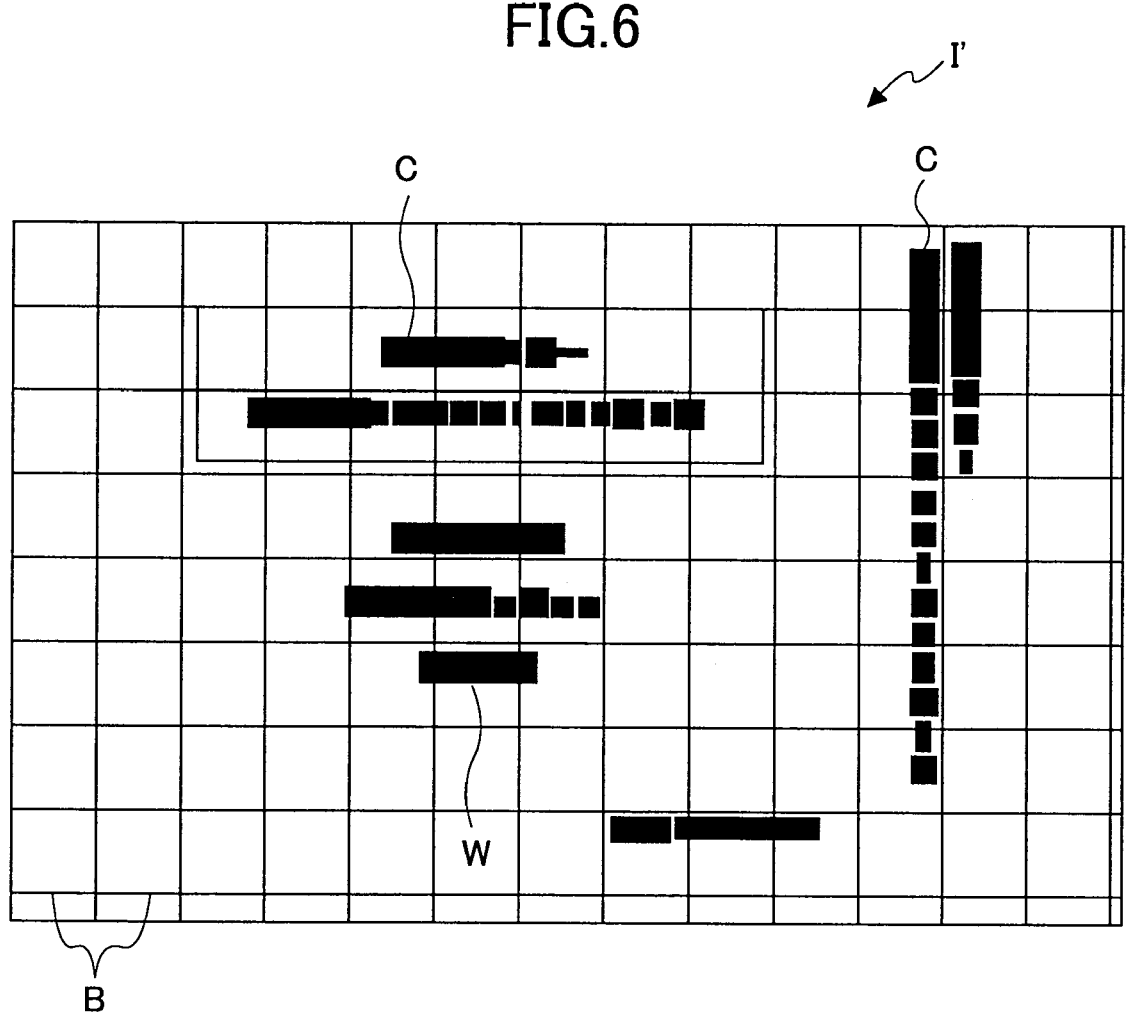
FIG. 6 shows a character area extracted from the input image shown in FIG. 5, and blocks divided in the input image shown in FIG. 5.

Besides, the character area extraction part 3001 forms a binary image having a same size as the original image ($I_O$) which binary image has an ON value at (an element of) the character area C, and has an OFF value at other area (see FIG. 6). The character area extraction part 3001 builds a transverse run along which background pixels (pixels of the OFF value) exist in the above-mentioned binary image. When a certain run has a length shorter than a predetermined threshold value $\tau$, the character area extraction part 3001 temporarily turns ON the pixels existing along the run. Thus, the character area extraction part 3001 performs a smearing of the run of the background pixels in a transverse direction, and similarly, performs a smearing of a run of background pixels in a longitudinal direction. Then, the character area extraction part 3001 obtains an AND of the smearing of the transverse run of the background pixels and the smearing of the longitudinal run of the background pixels so as to set only pixels provided with the ON value by smearing in both directions as final foreground monochrome pixels (the character area C). Thereby, an image I' including the character area C extracted as shown in FIG. 6 can be obtained from the original image ($I_O$) as shown in FIG. 5.

(5) Block Division and Class Classification of Character Area (Block Division Part, Class Classification Part)

The block division part divides the original image ($I_O$) into sufficiently small blocks B not overlapping one another (see FIG. 6). In this course, each of the blocks B may be provided with a size and a shape, such as a square with each side having a length of r equivalent to 20 mm (160 pixels in 200 dpi, 320 pixels in 400 dpi). The class classification part classifies pixels belonging to the character area C into two classes according to brightness of each of the pixels in each of the divided blocks B.

Upon classifying the pixels, the class classification part calculates the brightness from color signals of each of the pixels, and performs a threshold processing thereto. Known methods, such as a discrimination analysis method, a moment preservation method, and an entropy method, can be used for the threshold processing, which is a known technology, and is not explained herein. In a block Bi, the class classification part classifies a group of darker pixels (each having a low brightness) into a first class $R_{i1}$, and classifies a group of brighter pixels (each having a high brightness) into a second class $R_{i2}$. Since a brighter color is usually related to a background color of the character area, and a darker color is usually related to a character color, the first class $R_{i1}$ corresponds to a character, and the second class $R_{i2}$ corresponds to a background (a ground) in the present embodiment. Thus, the class classification part classifies pixels belonging to the character area C into the first class $R_{i1}$ and the second class $R_{i2}$ in all of the blocks B.

(6) Estimation of Black Character Color and Ground Color (Black-Character-Color/Ground-Color Statistical Estimation Part 4001: Black-Character-Color/Ground-Color Estimation Part)

Figure 7:
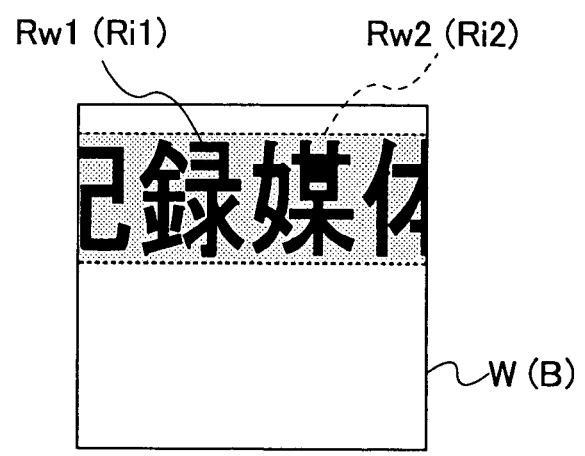
FIG. 7 shows a window selected from the input image divided into the blocks shown in FIG. 6, and groups of pixels classified in the selected window.

The black-character-color/ground-color statistical estimation part 4001 selects a block B including a maximum number of pixels classified into the second class $R_{i2}$ as a window W from all of the blocks in which pixels belonging to the black character area C are classified into the first class $R_{i1}$ and the second class $R_{i2}$, and sets an average color of pixels (a group of pixels $R_{w1}$) classified into the first class $R_{i1}$ in the selected window W as a black character color in the original image. FIG. 7 shows an area selected as the window W in the input image shown in FIG. 5, and groups $R_{w1}$ and $R_{w2}$ of pixels therein. In FIG. 7, the black-character-color/ground-color statistical estimation part 4001 sets the average color of the group of the pixels $R_{w1}$ as the color of a black character in the original image, and sets an average color of the group of the pixels $R_{w2}$ as a ground color in the original image.

(7) Tone Correction According to Statistics of Black Character Color and Ground Color (Tone Correction Part 5001)

The tone correction part 5001 calculates statistics (an average value and a standard deviation) of brightness in each of the groups $R_{w1}$ and $R_{w2}$, and performs a tone correction according to the statistics ($l_1$, $\sigma_1$, $l_2$, $\sigma_2$) regarding the black character color and the ground color of the input image which statistics are calculated in the window W. The statistics $l_1$ and $\sigma_1$ are the calculated average value and the standard deviation, respectively, of the brightness in the group $R_{w1}$. The statistics $l_2$ and $\sigma_2$ are the calculated average value and the standard deviation, respectively, of the brightness in the group $R_{w2}$. The average value $l_1$ is smaller than the average value $l_2$.

In a default tone correction performed by the tone correction part 5001, each of R, G and B components may be converted by a function that may shift the average value $l_1$ to 0, and shift the average value $l_2$ to 255, as shown in expression (4) below.

$$f(x) = \begin{cases} 0 & \text{if } x < l_1 \\ \dfrac{255}{(l_2 - l_1)}(x - l_1) & \text{if } l_1 = <x = <l_2 \\ 255 & \text{if } l_2 < x \end{cases} \quad \text{(Expression 4)}$$

At this point, a range of an input signal value to be clipped to 0 or 255 needs to be adjusted according to characteristics of the image output apparatus. For example, in a printer having a high capability in representing a highlight color, a brightness value for an input signal to be clipped to white needs to be set low. On the other hand, in a printer having a low capability in representing a highlight color, a brightness value for an input signal to be clipped to white does not need to be set low.

Besides, the tone correction of the black character color and the ground color by the tone correction part 5001 needs to be performed in consideration of changes of the ground color in the input image. Therefore, a degree of the correction is adjusted according to the standard deviation (distribution) $\sigma_1$ of the black character color and the standard deviation (distribution) $\sigma_2$ of the ground color calculated above. Specifically, a correction according to an operation represented by an expression (5) below may be performed (see FIG. 8). Besides, values of adjustment parameters a and b are specified by a user, and are suitably set according to characteristics of the printer used for printing, preferences of the user, and so forth.

$$f(x) = \begin{cases} 0 & \text{if } x < l_1 + a \cdot \sigma_1 \\ \dfrac{255}{(l_2 - b \cdot \sigma_2 - l_1 - a \cdot \sigma_1)} (x - l_1 - a \cdot \sigma_1) & \text{if } l_1 + a \cdot \sigma_1 = <x = <l_2 - b \cdot \sigma_2 \\ 255 & \text{if } l_2 - b \cdot \sigma_2 < x \end{cases} \quad \text{(Expression 5)}$$

Figure 8:
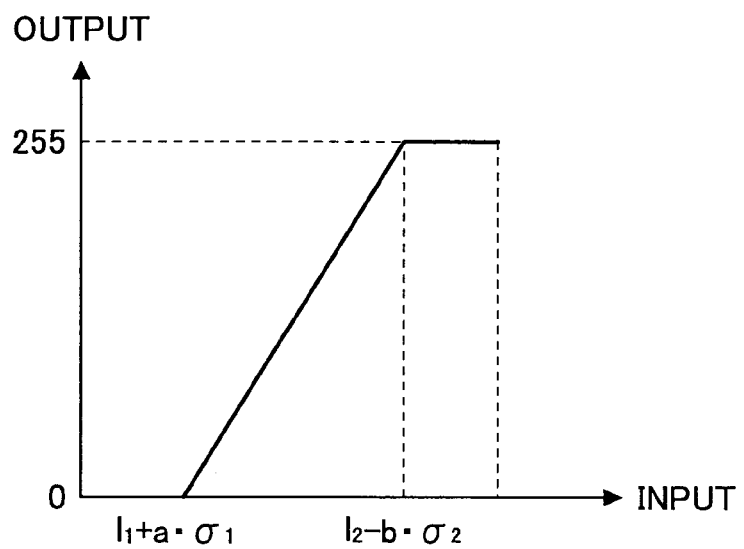
FIG. 8 is a graph used for explaining a tone correction according to statistics of a black character color and a ground color in the first embodiment of the present invention.
Figure 9:
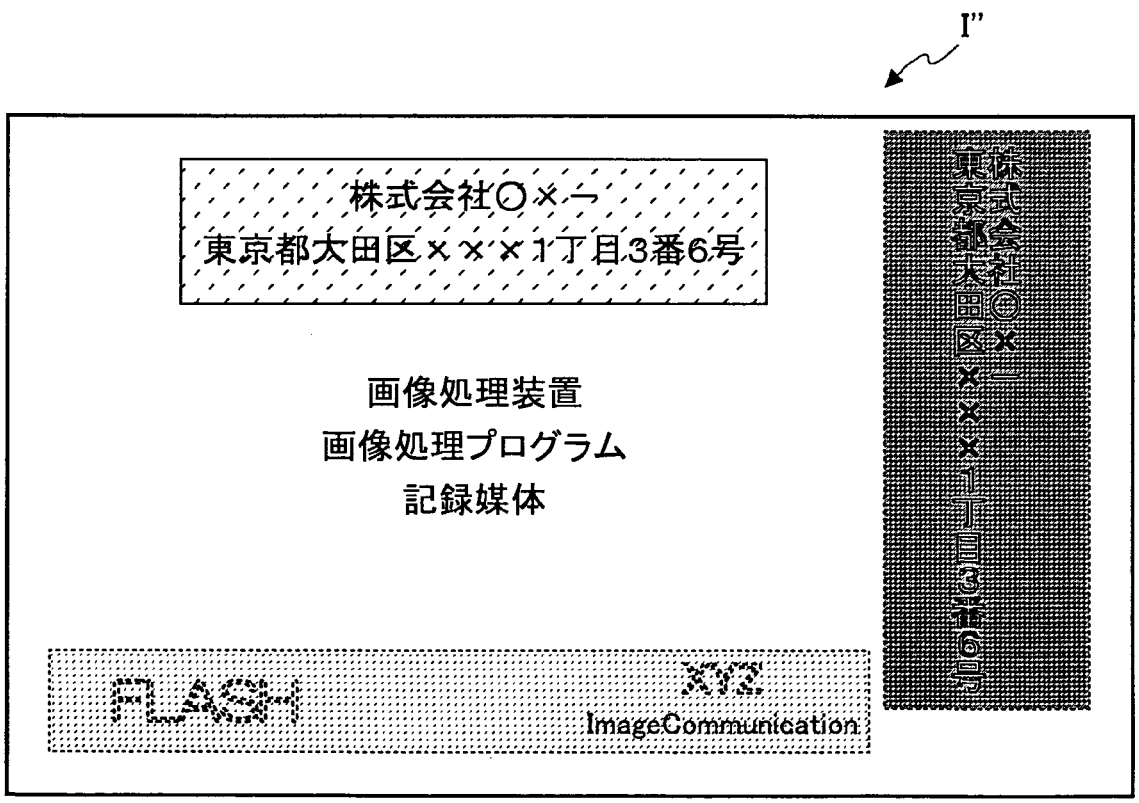
FIG. 9 shows an image obtained by performing the tone correction of the first embodiment of the present invention to the input image shown in FIG. 5.

As shown in FIG. 8, larger values of the adjustment parameters a and b intensify an enhancement of the black character, a removal of the ground, and a contrast enhancement. FIG. 9 shows an image I" obtained by performing the tone correction to the input image (the original image ($I_0$)) shown in FIG. 5.

By the way, since the tone correction depends on characteristics of the image output apparatus, the degree of the correction for the black character and the ground has to be able to be easily adjusted. For example, a printer having a high capability in representing a highlight color needs a setting in which a brightness value for an input signal to be clipped to white is set low; on the other hand, a printer having a low capability in representing a highlight color does not need such a setting. Further, the adjustment of the degree of the correction has to be performed in consideration of changes of the ground color in the input image. In order to achieve objects of a "comprehensive tone correction suitable for a document image, such as changing a ground into white and changing a black character into black while maintaining a gradation of a middle-tone area" and "parameters (the color of the ground or the black character) adaptively calculable from the image which parameters determine the processing", the black character color and the ground color need to be estimated correctly.

In the present embodiment, according to the calculated distributions (the standard deviations) of the black character color and the ground color, a default tone correction is performed for example in which the average value of the ground color is shifted to white (maximum brightness), and the average value of the black character color is shifted to black (minimum brightness); and upon adjusting the degree of the correction, the degree of the correction is shifted from the average values by products of the standard deviations and the adjustment parameters. Accordingly, a user can easily adjust the processing according to characteristics of the image output apparatus.

According to the present embodiment, upon outputting the original image ($I_0$), which is a digital image input from the image input apparatus 401, from the image output apparatus 501, such as a printer, a tone correction is performed to the original image ($I_0$) according to a black character color and a ground color estimated from the original image ($I_0$) according to values calculated from feature values of the original image ($I_0$), without necessarily using predetermined parameters. Therefore, while a gradation of a middle-tone area in the original image ($I_0$) input from the various image input apparatus 401 is maintained, a contrast between the black character and the ground in an output image can be automatically adjusted, without a user performing an operation, such as setting a parameter.

Besides, according to the present embodiment, based on results of the class classification in each of the blocks B, an average color of the group of pixels $R_{w1}$ classified into the first class $R_{i1}$ in the window W that is a block B including a maximum number of pixels classified into the second class $R_{i2}$ is estimated as the black character color, and an average color of the group of pixels $R_{w2}$ classified into the second class $R_{i2}$ in the window W that is the same block B is estimated as the ground color. Thus, the black character color and the ground color can be estimated correctly.

Next, a description will be given, with reference to FIG. 10 to FIG. 15, of a second embodiment according to the present invention. Elements in the present second embodiment and other hereinafter-described embodiments that are identical or equivalent to the elements described in the foregoing first embodiment are referenced by the same reference marks, and will not be described in detail.

Figure 10:
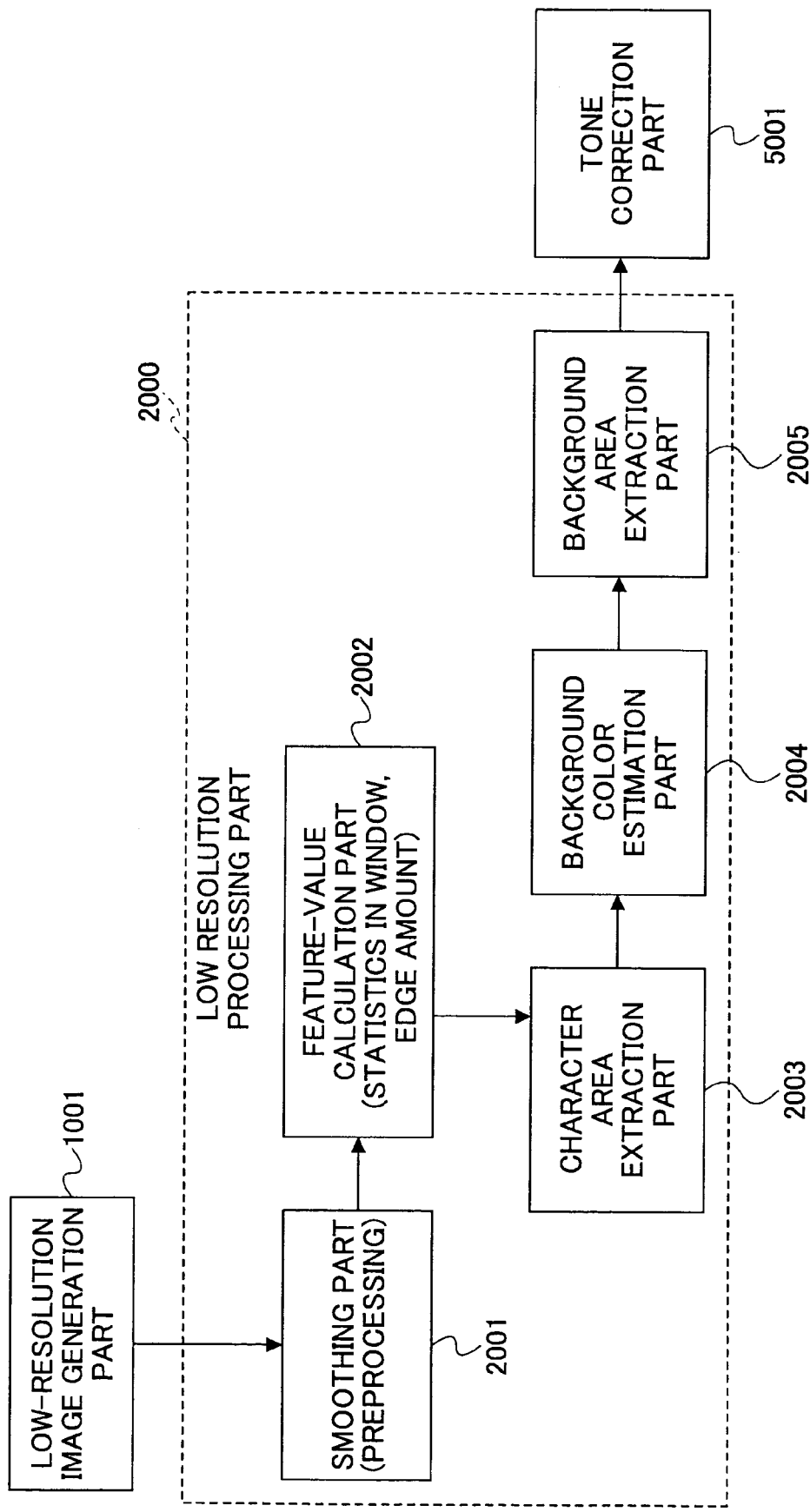
FIG. 10 is a functional block diagram illustrating parts operated by the personal computer according to an image processing program in a second embodiment of the present invention.
Figure 11:
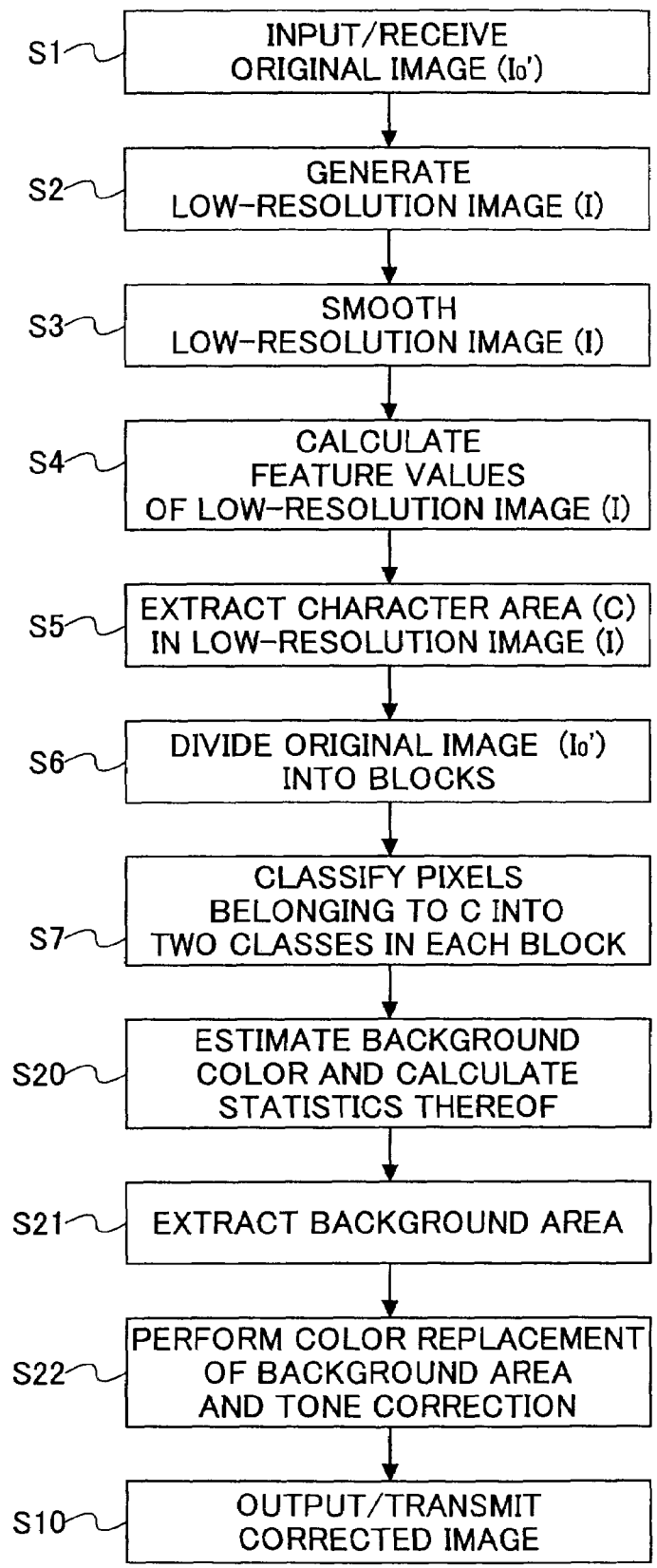
FIG. 11 is a flowchart showing a procedure of operating the parts included in the functional block diagram shown in FIG. 10.

FIG. 10 is a functional block diagram illustrating parts operated by the personal computer 301 according to the image processing program in the present second embodiment. FIG. 11 is a flowchart showing a procedure of operating the parts included in the functional block diagram shown in FIG. 10. Upon executing the image processing program, the personal computer 301 performs various steps shown in the flowchart of FIG. 11 by the parts (functions) shown in the functional block diagram of FIG. 10.

In the present second embodiment, the low resolution processing part 2000 not only includes the smoothing part 2001 and the feature-value calculation part 2002, but also includes a character area extraction part 2003 (see the character area extraction part 3001 in FIG. 3) performing a local adaptive binarization of each color component by performing a local adaptive threshold processing and an expansion processing to the low-resolution image (I) so as to perform an extractive detection of the character area C (shown in FIG. 6).

Besides, in the present second embodiment, the low resolution processing part 2000 also includes a background color estimation part 2004 and a background area extraction part (a background area specification part) 2005, as described hereinbelow.

Step S1 to step S7 in FIG. 11 are performed in a similar manner as step S1 to step S7 in FIG. 4. Then, the background color estimation part 2004 selects a window having a maximum value of an objective function determined according to a number of pixels classified into a brighter-color class and a brightness of the brighter color, sets the brighter representative color in this window as an average color of a background in the input image, and further estimates a background color by calculating statistics of the brightness (S20). Then, the background area extraction part 2005 extracts (specifies) a background area according to the calculated statistics (S21). Subsequently, the tone correction part 5001 performs a tone correction by replacing a color of the extracted (specified) background area with the estimated average color of the background, and preventing pixels other than the background from being gradationally discontinuous with the background area (S22). Then, step S10 is performed.

Figure 12:
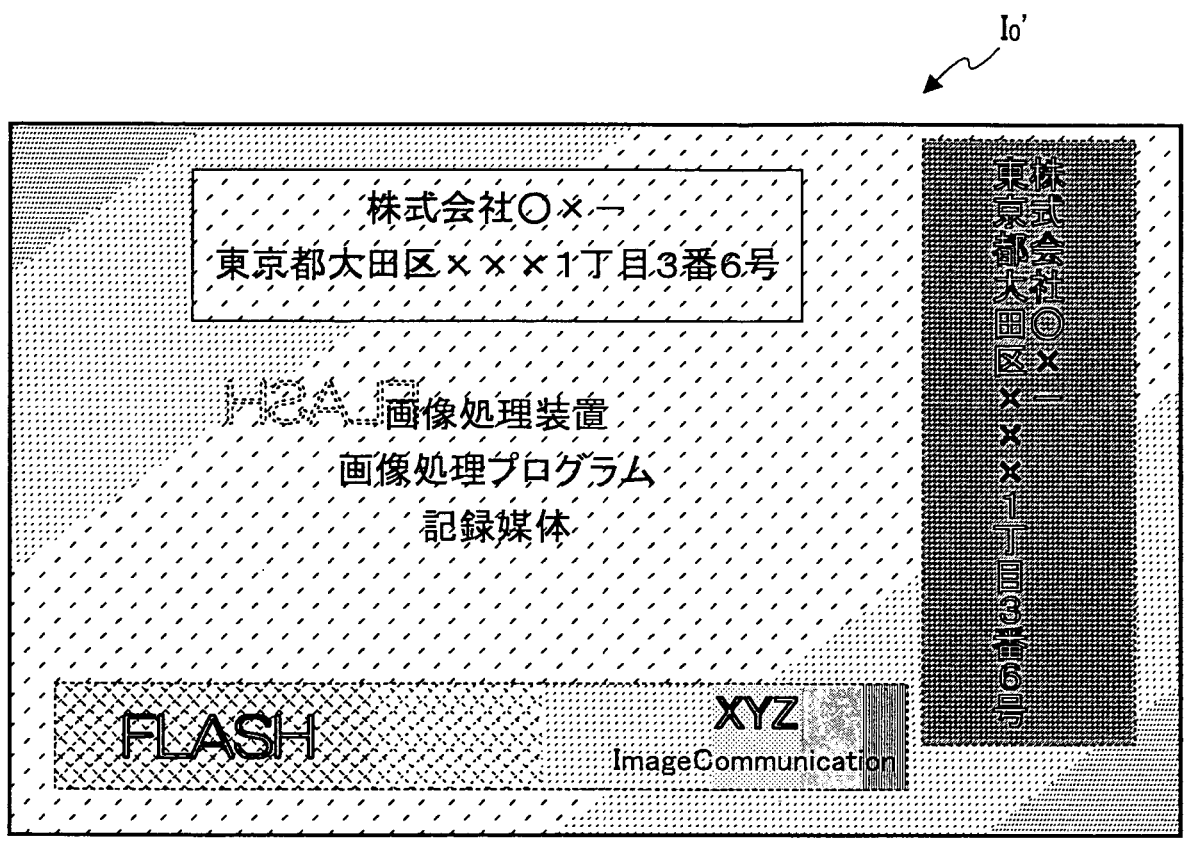
FIG. 12 shows an example of an input image in the second embodiment of the present invention.

Next, a description will be given of details of each of the above-described parts operated by the personal computer 301 in the present second embodiment. FIG. 12 shows an example of the input image, i.e., an original image ($I_0$'), in the present second embodiment. In the original image ($I_0$'), compared with the original image ($I_0$), an area forming a background part is composed of a plurality of background colors.

(8) Estimation of Color of Background (Background Color Estimation Part 2004)

The background color estimation part 2004 defines an objective function based on a number $N_i$ of pixels classified into the second class $R_{i2}$ and an average brightness $L_i$ of the second class $R_{i2}$, and finds a block (a window) W in which the objective function has a maximum value. The objective function is defined, for example, such as $N_i \times L_i$, which has a larger value as the number $N_i$ of pixels becomes larger and the average brightness $L_i$ becomes higher (see FIG. 7). In the present second embodiment, the background color estimation part 2004 sets an average color of a group of pixels $R_{w2}$ (classified into the second class $R_{i2}$) as a background color in the original image. Further, the background color estimation part 2004 calculates statistics (an average value $l_B$ and a standard deviation σ) of brightness in the group $R_{w2}$.

(9) Extraction (Specification) of Background Area (Background Area Extraction Part 2005: background Area Specification Part)

Figure 13:
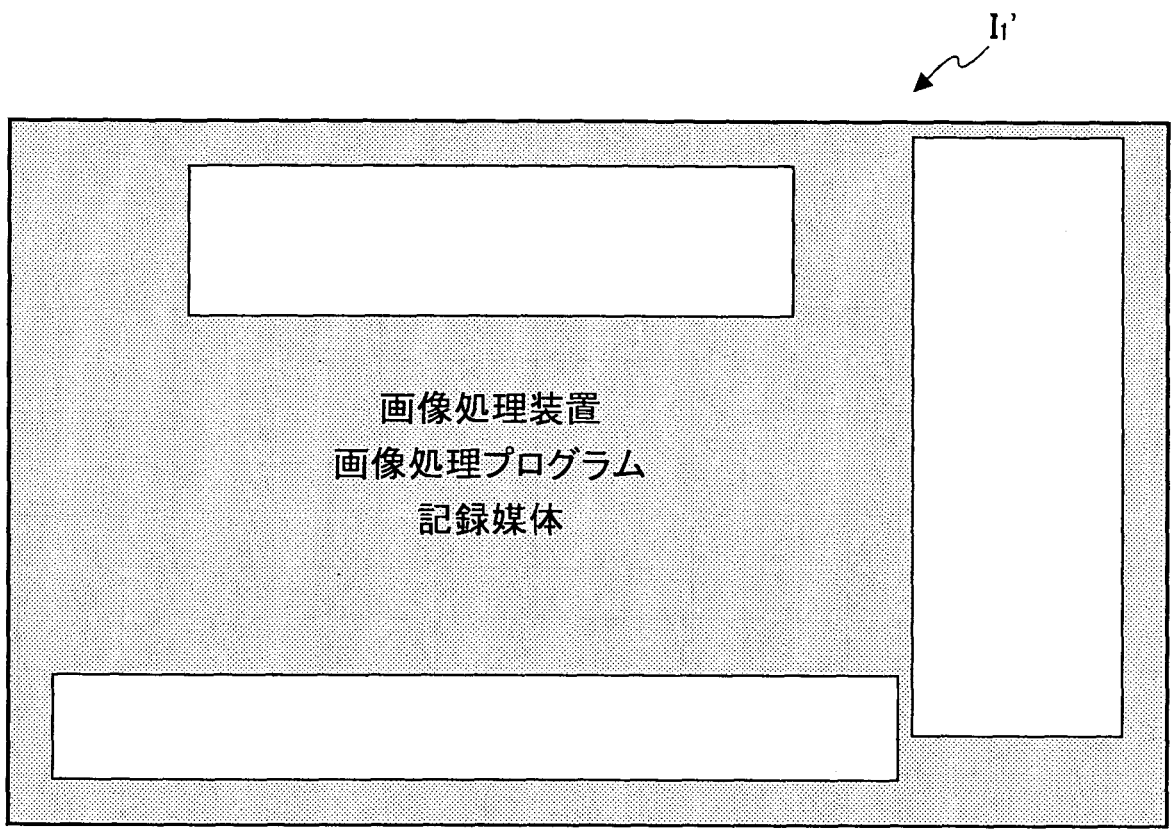
FIG. 13 shows pixels extracted as a background from the input image shown in FIG. 12.
Figure 14:
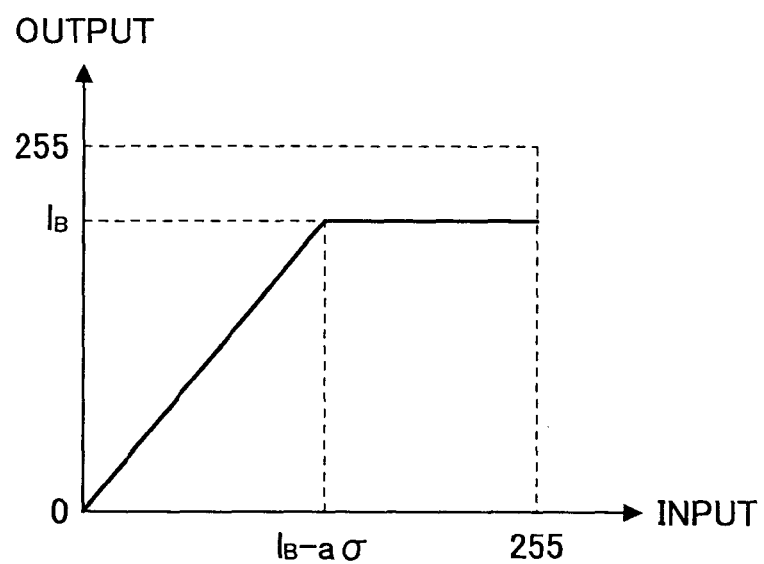
FIG. 14 is a graph used for explaining a tone correction according to statistics of a background color in the second embodiment of the present invention.

The background area extraction part 2005 extracts (specifies) a background area according to the statistics of the brightness of the background. In the present second embodiment, a pixel having a brightness L satisfying $l_B - a\sigma < L < l_B$ (wherein a is a positive parameter) in the low-resolution image (I) is regarded as the background area. The parameter a is determined according to changes of the background, a degree of a show-through effect and so forth; for example, when the degree of the show-through effect is strong, the (adjustment) parameter a may be set large. FIG. 13 shows an image $I_1$' in which pixels extracted as the background are represented as black dots.

As described above, in the present second embodiment, the background area is determined according to the average value $l_B$ and the standard deviation σ of the brightness in the group $R_{w2}$. However, not limited thereto, by using a median $m_B$ and an α-percent quantile $α_B$ (e.g., α being 25) of a brightness distribution in the group $R_{w2}$ instead, a pixel having a brightness L satisfying $α_B < L < m_B$ may be extracted as the background area.

(10) Tone Correction According to Statistics of Color of Background (Tone Correction Part 5001)

First, with respect to the original image ($I_0$'), the tone correction part 5001 according to the present second embodiment replaces a color of each pixel in the background area with the average color of the background calculated in the block W. As for pixels other than the background, the tone correction part 5001 converts each of R, G and B components by using an expression (6) shown below so as to prevent the pixels other than the background from being gradationally discontinuous with the background (see FIG. 14).

$$f(x) = \begin{cases} \dfrac{l_B}{l_B - a\sigma} x & \text{if } x < l_B - a\sigma \\ l_B & \text{if } l_B - a\sigma \leq x \end{cases} \quad \text{(Expression 6)}$$

Figure 15:
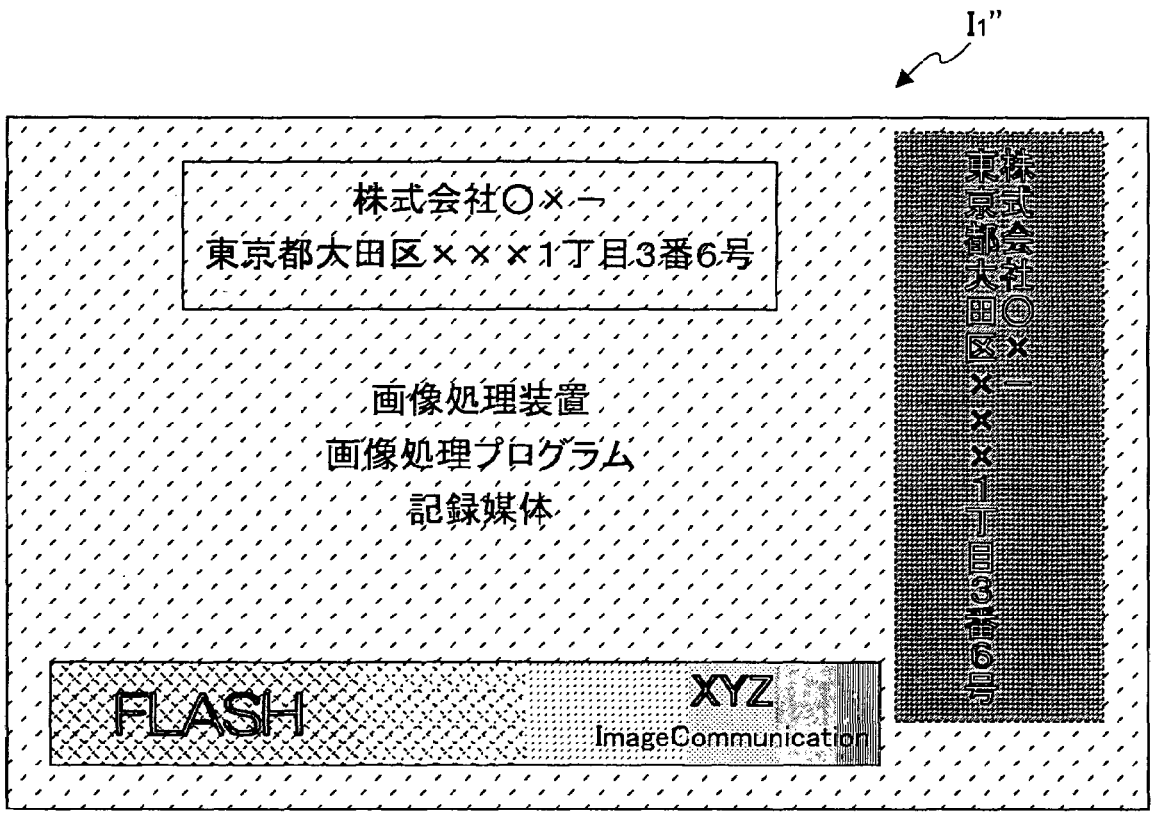
FIG. 15 shows an image obtained by performing the tone correction of the second embodiment of the present invention to the input image shown in FIG. 12.

FIG. 15 shows an image $I_1$'' obtained by performing the tone correction to the input image (the original image ($I_0$')) shown in FIG. 12.

As described above, in the present second embodiment, each of R, G and B components is converted according to the expression (6). However, not limited thereto, each of R, G and B components may be converted by using an expression (7) shown below.

$$f(x) = \begin{cases} \dfrac{m_B}{\alpha_B} x & \text{if } x < \alpha_B \\ m_B & \text{if } \alpha_B \leq x \end{cases} \quad \text{(Expression 7)}$$

Thus, in the present second embodiment, since a color document image is composed of two types of areas, i.e., a foreground and a background, from a local point of view, an issue of a statistical estimation of a background color is reduced to a simple two-class matter. Specifically, a partial area containing a true background color is searched for from a digital color image, the area is classified into two classes of the foreground and the background, and a representative color and a variation of the background (a ground) are extracted from a color and a gradation distribution of the background. Therefore, a conventional analysis of a histogram comprising a mixture distribution can be avoided.

Then, a background area is extracted from the image as a whole according to these statistics, and the background area is replaced with the estimated representative color, and further, pixels other than the background are subjected to a tone conversion so as to prevent the pixels other than the background from being gradationally discontinuous with the background area.

Accordingly, a color of a background/ground can be automatically calculated from image characteristics by a statistical procedure without necessitating knowledge and characteristic information concerning the input apparatus or using predetermined parameters. Thus, an image deterioration originating from causes in a background part, such as changes of color of the background or a show-through effect, in an original image input from the various image input apparatus is corrected automatically without depending on the knowledge and characteristic information concerning the input apparatus or using predetermined parameters, or without a user performing an operation, such as setting a parameter, so that the background part is made more appropriate, thereby obtaining an output image containing easily viewable characters and so forth. Besides, according to the present second embodiment, an image deterioration originating from causes in a background part, such as changes of color of the background or a show-through effect, in a digital image transmitted from a remote place via a network with an input apparatus being unknown is corrected automatically so as to make the background part more appropriate, thereby obtaining an output image containing easily viewable characters and so forth.

Next, a description will be given, with reference to FIG. 4 or FIG. 11, of a third embodiment according to the present invention. In the present third embodiment, the calculation of feature values in step S4 in FIG. 4 or FIG. 11 and the extraction of a character area in step S5 in FIG. 4 or FIG. 11 are performed according to edge amounts.

When a black character is printed directly on a ground, there is a tendency of a contrast becoming strong at all of channels of R, G and B.

Accordingly, in the present third embodiment, a character area is extracted by using a minimum edge amount among edge amounts calculated at each of the channels of R, G and B as an edge amount in a subject pixel.

Upon extracting the character area, first, an edge amount in each pixel is calculated, and when the edge amount calculated in each pixel is higher than a predetermined threshold value set beforehand prior to image processing, the pixel is set as an element of the character area C. Thereafter, smearing of a run of pixels is performed in the same manner as in the foregoing first embodiment.

For example, an edge amount in a pixel (i, j) may be obtained as a maximum edge amount among edge amounts separately calculated for each of the three channels (R, G and B). That is, the edge amount in the pixel (i, j) can be represented by an expression (8) shown below. Thus, a function of the feature-value calculation part is performed.

$$E_0[i,j] = \max\{S[I;i,j;R], S[I;i,j;G], S[I;i,j;B]\} \quad \text{(Expression 8)}$$

In the expression (8), $S[I;i,j;k]$ represents an edge intensity in the pixel (i, j) at a k channel in the low-resolution image (I).

By performing the threshold processing (thr) to the edge amount calculated as above, a pixel having an edge amount higher than the predetermined threshold value is specified. Accordingly, the pixel having the edge amount higher than the predetermined threshold value, and pixels around this pixel, are extracted as the character area C. Thus, a function of the character area extraction part is performed. Besides, the above-mentioned predetermined threshold value may be set beforehand as a fixed value, or may be set/changed from outside prior to the execution of the image processing program.

According to the present third embodiment, a black character color and a ground color (a background color) can be estimated correctly.

Next, a description will be given, with reference to FIG. 4 or FIG. 11, of a fourth embodiment according to the present invention.

In the present fourth embodiment, the calculation of feature values in step S4 in FIG. 4 or FIG. 11 and the extraction of a character area in step S5 in FIG. 4 or FIG. 11 are performed by using not only statistics in a window W but also edge amounts.

Upon calculating feature values, statistics in the window W and an edge amount are calculated in the same manner as in the foregoing first embodiment to the foregoing third embodiment. Thus, a function of the feature-value calculation part is performed.

Subsequently, upon extracting a character area C, first, it is judged whether a signal value is lower at all of the channels than a threshold value calculated from the statistics in the window W, or whether the edge amount is higher than a predetermined threshold value. Then, a pixel judged to have a signal value lower at all of the channels than the threshold value calculated from the statistics in the window W, or to have an edge amount higher than the predetermined threshold value, and pixels around this pixel, are set as elements of the character area C. Thus, a function of the character area extraction part is performed.

Thereafter, smearing of a run of pixels is performed in the same manner as in the foregoing first embodiment.

According to the present fourth embodiment, a black character color and a ground color can be estimated correctly.

Next, a description will be given, with reference to FIG. 4 or FIG. 11, of a fifth embodiment according to the present invention.

In the present fifth embodiment, the generation of a low-resolution image (I) having a lower resolution than the original image ($I_0$) or ($I_0'$) in step S2 in FIG. 4 or FIG. 11 is not performed, and the calculation of feature values in step S4 and the extraction of a character area in step S5 are performed with respect to the original image ($I_0$) or ($I_0'$).

According to the present fifth embodiment, the calculation of the feature values and the extraction of the character area can be performed with respect to the original image ($I_0$) or ($I_0'$) without performing the generation of the low-resolution image (I).

Next, a description will be given, with reference to FIG. 4, of a sixth embodiment according to the present invention. In the present sixth embodiment, the estimation of a black character color in step S8 in FIG. 4 is performed in a different manner from the foregoing first and third to fifth embodiments.

(6)' Estimation of Black Character Color and Ground Color

First, pixels belonging to the black character area C are classified into the first class $R_{i1}$ and the second class $R_{i2}$ in all of the blocks B. Next, a block B including a group of pixels $R_{w1}$ (classified into the first class $R_{i1}$) and a group of pixels $R_{w2}$ (classified into the second class $R_{i2}$) having a maximum difference in average brightness therebetween is selected, and this block B is set as a window W. Then, an average color of the group of the pixels $R_{w1}$ in the window W is set as a black character color in the original image ($I_0$), and an average color of the group of the pixels $R_{w2}$ is set as a ground color in the original image ($I_0$).

Besides, the estimation according to the present sixth embodiment may be similarly applied to the foregoing second embodiment and the following seventh embodiment each of which performs the estimation of a background color in step S20 in FIG. 11.

Besides, in the present sixth embodiment, statistics used in tone correction are calculated in the window W.

Figure 16:
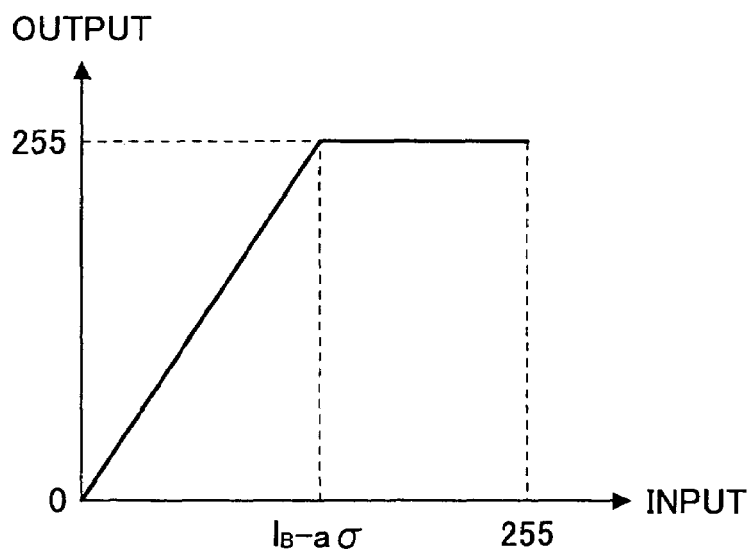
FIG. 16 is a graph used for explaining a tone correction according to statistics of a background color in a seventh embodiment of the present invention.

Next, a description will be given, with reference to FIG. 11, FIG. 16 and FIG. 17, of a seventh embodiment according to the present invention. In the present seventh embodiment, upon performing a tone correction in step S22 in FIG. 11, each of R, G and B components is not converted according to the function of the foregoing expression (6) (see FIG. 14), but is converted according to a function of an expression (9) shown below (see FIG. 16).

$$f(x) = \begin{cases} \dfrac{255}{l_B - a\sigma} x & \text{if } x < l_B - a\sigma \\ 255 & \text{if } l_B - a\sigma \le x \end{cases} \quad \text{(Expression 9)}$$

Figure 17:
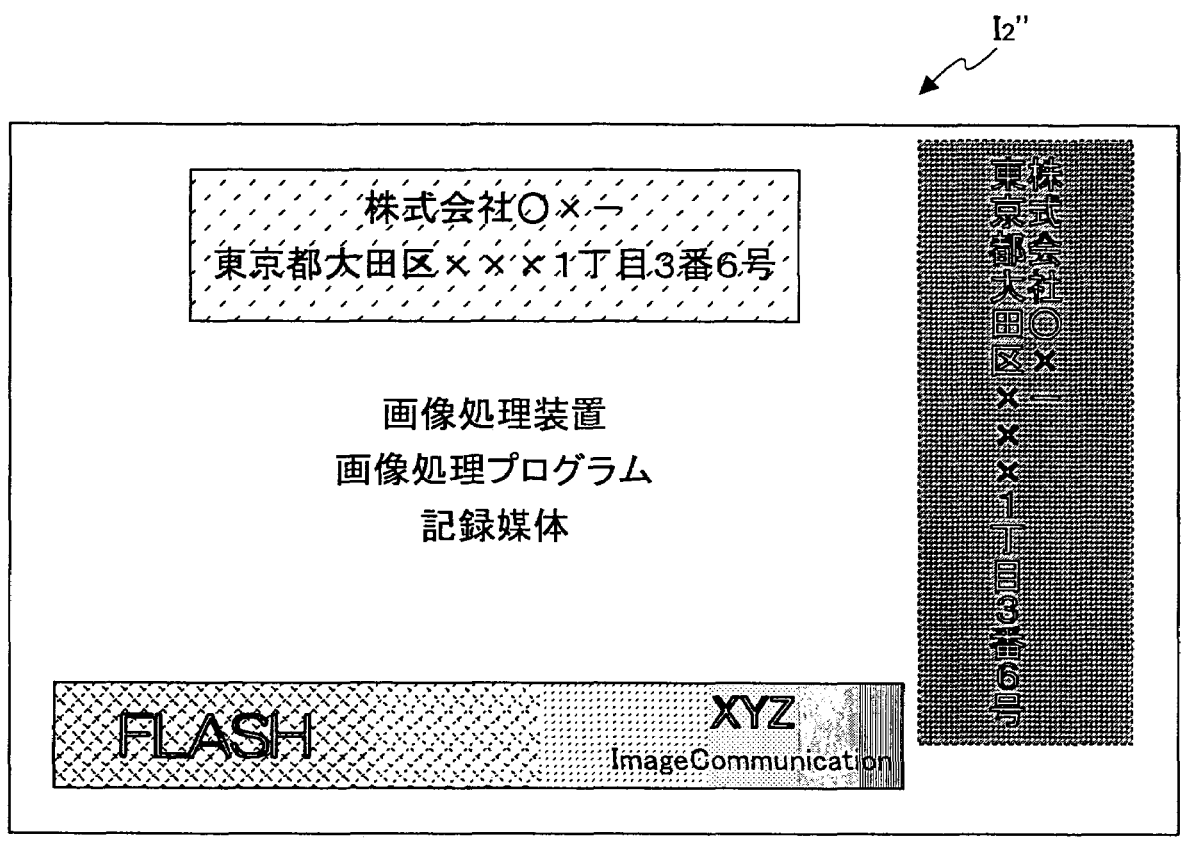
FIG. 17 shows an image obtained by performing the tone correction of the seventh embodiment of the present invention to the input image shown in FIG. 12.

Thus, by performing the tone correction in which each of R, G and B components is converted according to the function of the expression (9), an image $I_2''$ including a background part converted into white as shown in FIG. 17 can be obtained.

As described above, in the present seventh embodiment, each of R, G and B components is converted according to the expression (9). However, not limited thereto, each of R, G and B components may be converted by using an expression (10) shown below.

$$f(x) = \begin{cases} \dfrac{255}{\alpha_B} x & \text{if } x < \alpha_B \\ 255 & \text{if } \alpha_B \le x \end{cases} \quad \text{(Expression 10)}$$

Besides, the tone correction according to the present seventh embodiment may be applied to the foregoing second to sixth embodiments each of which performs a similar tone correction in step S22 in FIG. 11.

The present invention is not limited to the specifically disclosed embodiments, and variations and modifications may be made without departing from the scope of the present invention.

The present application is based on Japanese priority applications No. 2002-259618 filed on Sep. 5, 2002, No. 2002-280789 filed on Sep. 26, 2002, No. 2003-048834 filed on Feb. 26, 2003, and No. 2003-163565 filed on Jun. 9, 2003, the entire contents of which are hereby incorporated by reference.

What is claimed is:

1. An image processing device comprising:
   a low-resolution image generation part generating a low resolution image from the original image, said low resolution image having a lower resolution than the original image;
   a feature-value calculation part calculating a feature value with respect to an original image that is a digital image;
   a character area extraction part performing a local adaptive binarization of each color component by performing a local adaptive threshold processing and an expansion processing to the low-resolution image so as to perform an extractive detection of a character area and extracting a character area from said original image according to said feature value;
   a block division part dividing said original image into blocks;
   a class classification part classifying pixels belonging to said character area in each of said blocks into a first class and a second class according to colors;
   a black-character-color/ground-color estimation part estimating a black character color and a ground color on said original image according to the pixels belonging to said character area being classified into said first class and said second class; and
   a tone correction part performing a tone correction to said original image according to the estimated black character color and the estimated ground color.

2. The image processing device as claimed in claim 1, wherein said feature-value calculation part calculates an average value and a standard deviation of color signals in a window set around each pixel, and
   said character area extraction part extracts a pixel and pixels around said pixel as said character area according to a color signal value of said pixel in relation to a threshold value based on said average value and said standard deviation.

3. The image processing device as claimed in claim 1, wherein said feature-value calculation part calculates an edge amount of each pixel, and
   said character area extraction part extracts a pixel having the edge amount equal to or larger than a predetermined threshold value, and pixels around said pixel, as said character area.

4. The image processing device as claimed in claim 1, wherein said feature-value calculation part calculates an edge amount of each pixel and calculates an average value and a standard deviation of color signals in a window set around each pixel, and
   said character area extraction part extracts a pixel having the edge amount equal to or larger than a predetermined threshold value, and pixels around said pixel, as said character area, and extracts a pixel and pixels around said pixel as said character area according to a color signal value of said pixel in relation to a threshold value based on said average value and said standard deviation.

5. The image processing device as claimed in claim 1, wherein said class classification part obtains a brightness threshold value based on a brightness calculated from color signals of each of the pixels, and classifies a group of pixels each having the brightness lower than said brightness threshold value into said first class, and a group of pixels each having the brightness higher than said brightness threshold value into said second class.

6. The image processing device as claimed in claim 5, wherein said tone correction part performs the tone correction according to a tone conversion curve based on an average value and a standard deviation of brightness in a group of pixels classified into said first class in one of said blocks including a maximum number of pixels classified into said second class, and on an average value and a standard deviation of brightness in a group of said pixels classified into said second class, according to a result of said classifying by said class classification part in each of said blocks.

7. The image processing device as claimed in claim 5, wherein said tone correction part performs the tone correction according to a tone conversion curve based on an average value and a standard deviation of brightness in a group of pixels classified into said first class in one of said blocks including said group of said pixels classified into said first class and a group of pixels classified into said second class, the groups having a maximum difference in average brightness therebetween, and on an average value and a standard deviation of brightness in said group of said pixels classified into said second class, according to a result of said classifying by said class classification part in each of said blocks.

8. The image processing device as claimed in claim 1, wherein said black-character-color/ground-color estimation part estimates an average color of a group of pixels classified into said first class in one of said blocks including a maximum number of pixels classified into said second class as the black character color, and estimates an average color of a group of said pixels classified into said second class as the ground color, according to a result of said classifying by said class classification part in each of said blocks.

9. The image processing device as claimed in claim 1, wherein said black-character-color/ground-color estimation part estimates an average color of a group of pixels classified into said first class in one of said blocks including said group of said pixels classified into said first class and a group of pixels classified into said second class, the groups having a maximum difference in average brightness therebetween, as the black character color, and estimates an average color of said group of said pixels classified into said second class as the ground color, according to a result of said classifying by said class classification part in each of said blocks.

10. The image processing device as claimed in claim 1, further comprising a low-resolution image generation part generating a low-resolution image having a lower resolution than said original image,
wherein said feature-value calculation part calculates the feature value from said low-resolution image, and
said character area extraction part extracts said character area from said low-resolution image.

11. An image processing device comprising:
a low-resolution image generation part generating a low resolution image from the original image, said low resolution image having a lower resolution than the original image;
a feature-value calculation part calculating a feature value with respect to an original image that is a digital image;
a character area extraction part performing a local adaptive binarization of each color component by performing a local adaptive threshold processing and an expansion processing to the low-resolution image so as to perform an extractive detection of a character area and extracting a character area from said original image according to said feature value;
a block division part dividing said original image into blocks;
a class classification part classifying pixels belonging to said character area in each of said blocks into a first class and a second class according to colors;
a background color estimation part estimating a background color on said original image according to the pixels belonging to said character area being classified into said first class and said second class;
a background area specification part specifying a background area on said original image according to the estimated background color; and
a tone correction part performing a tone correction to said original image by replacing a color of the specified background area with the estimated background color.

12. The image processing device as claimed in claim 11, wherein said feature-value calculation part calculates an average value and a standard deviation of color signals in a window set around each pixel, and
said character area extraction part extracts a pixel and pixels around said pixel as said character area according to a color signal value of said pixel in relation to a threshold value based on said average value and said standard deviation.

13. The image processing device as claimed in claim 11, wherein said feature-value calculation part calculates an edge amount of each pixel, and
said character area extraction part extracts a pixel having the edge amount equal to or larger than a predetermined threshold value, and pixels around said pixel, as said character area.

14. The image processing device as claimed in claim 11, wherein said feature-value calculation part calculates an edge amount of each pixel and calculates an average value and a standard deviation of color signals in a window set around each pixel, and
said character area extraction part extracts a pixel having the edge amount equal to or larger than a predetermined threshold value, and pixels around said pixel, as said character area, and extracts a pixel and pixels around said pixel as said character area according to a color signal value of said pixel in relation to a threshold value based on said average value and said standard deviation.

15. The image processing device as claimed in claim 11, wherein said class classification part obtains a brightness threshold value based on a brightness calculated from color signals of each of the pixels, and classifies a group of pixels each having the brightness lower than said brightness threshold value into said first class, and a group of pixels each having the brightness higher than said brightness threshold value into said second class.

16. The image processing device as claimed in claim 11, wherein said background color estimation part estimates an average color of a group of pixels classified into said second class in one of said blocks including a maximum number of said pixels classified into said second class as the background color, according to a result of said classifying by said class classification part in each of said blocks.

17. The image processing device as claimed in claim 11, wherein said background color estimation part estimates an average color of a group of pixels classified into said second class in one of said blocks including a group of pixels classified into said first class and said group of said pixels classified into said second class, the groups having a maximum difference in average brightness therebetween, as the background color, according to a result of said classifying by said class classification part in each of said blocks.

18. The image processing device as claimed in claim 11, further comprising a low-resolution image generation part generating a low-resolution image having a lower resolution than said original image,
wherein said feature-value calculation part calculates the feature value from said low-resolution image, and
said character area extraction part extracts said character area from said low-resolution image.

19. An image processing device comprising:
a low-resolution image generation part generating a low resolution image from the original image, said low resolution image having a lower resolution than the original image;
a feature-value calculation part calculating a feature value with respect to an original image that is a digital image;
a character area extraction part performing a local adaptive binarization of each color component by performing a local adaptive threshold processing and an expansion processing to the low-resolution image so as to perform an extractive detection of a character area and extracting a character area from said original image according to said feature value;
a block division part dividing said original image into blocks;
a class classification part classifying pixels belonging to said character area in each of said blocks into a first class and a second class according to colors;
a background color estimation part estimating a background color on said original image according to the pixels belonging to said character area being classified into said first class and said second class;
a background area specification part specifying a background area on said original image according to the estimated background color; and
a tone correction part performing a tone correction to said original image by replacing a color of the specified background area with a white color.

20. The image processing device as claimed in claim 19, wherein said feature-value calculation part calculates an average value and a standard deviation of color signals in a window set around each pixel, and
said character area extraction part extracts a pixel and pixels around said pixel as said character area according to a color signal value of said pixel in relation to a threshold value based on said average value and said standard deviation.

21. The image processing device as claimed in claim 19, wherein said feature-value calculation part calculates an edge amount of each pixel, and
said character area extraction part extracts a pixel having the edge amount equal to or larger than a predetermined threshold value, and pixels around said pixel, as said character area.

22. The image processing device as claimed in claim 19, wherein said feature-value calculation part calculates an edge amount of each pixel and calculates an average value and a standard deviation of color signals in a window set around each pixel, and
said character area extraction part extracts a pixel having the edge amount equal to or larger than a predetermined threshold value, and pixels around said pixel, as said character area, and extracts a pixel and pixels around said pixel as said character area according to a color signal value of said pixel in relation to a threshold value based on said average value and said standard deviation.

23. The image processing device as claimed in claim 19, wherein said class classification part obtains a brightness threshold value based on a brightness calculated from color signals of each of the pixels, and classifies a group of pixels each having the brightness lower than said brightness threshold value into said first class, and a group of pixels each having the brightness higher than said brightness threshold value into said second class.

24. The image processing device as claimed in claim 19, wherein said background color estimation part estimates an average color of a group of pixels classified into said second class in one of said blocks including a maximum number of said pixels classified into said second class as the background color, according to a result of said classifying by said class classification part in each of said blocks.

25. The image processing device as claimed in claim 19, wherein said background color estimation part estimates an average color of a group of pixels classified into said second class in one of said blocks including a group of pixels classified into said first class and said group of said pixels classified into said second class, the groups having a maximum difference in average brightness therebetween, as the background color, according to a result of said classifying by said class classification part in each of said blocks.

26. The image processing device as claimed in claim 19, further comprising a low-resolution image generation part generating a low-resolution image having a lower resolution than said original image,
wherein said feature-value calculation part calculates the feature value from said low-resolution image, and
said character area extraction part extracts said character area from said low-resolution image.

27. A computer readable recording medium storing an image processing program interpreted by a computer so as to cause said computer to perform:
a low-resolution image generation function of generating a low resolution image from the original image, said low resolution image having a lower resolution than said original image;
a feature-value calculation function of calculating a feature value with respect to an original image that is a digital image;
a character area extraction function of performing a local adaptive binarization of each color component by performing a local adaptive threshold processing and an expansion processing to the low-resolution image so as to perform an extractive detection of a character area and extracting a character area from said original image according to said feature value;
a block division function of dividing said original image into blocks;
a class classification function of classifying pixels belonging to said character area in each of said blocks into a first class and a second class according to colors;
a black-character-color/ground-color estimation function of estimating a black character color and a ground color on said original image according to the pixels belonging to said character area being classified into said first class and said second class; and a tone correction function of performing a tone correction to said original image according to the estimated black character color and the estimated ground color.

28. The computer readable recording medium as claimed in claim 27, wherein an average value and a standard deviation of color signals in a window set around each pixel are calculated by said feature-value calculation function, and
a pixel and pixels around said pixel are extracted as said character area by said character area extraction function according to a color signal value of said pixel in relation to a threshold value based on said average value and said standard deviation.

29. The computer readable recording medium as claimed in claim 27, wherein an edge amount of each pixel is calculated by said feature-value calculation function, and
a pixel having the edge amount equal to or larger than a predetermined threshold value, and pixels around said pixel, are extracted as said character area by said character area extraction function.

30. The computer readable recording medium as claimed in claim 27, wherein an edge amount of each pixel, and an average value and a standard deviation of color signals in a window set around each pixel are calculated by said feature-value calculation function, and
a pixel having the edge amount equal to or larger than a predetermined threshold value, and pixels around said pixel, are extracted as said character area by said character area extraction function, and a pixel and pixels around said pixel are extracted as said character area by said character area extraction function according to a color signal value of said pixel in relation to a threshold value based on said average value and said standard deviation.

31. The computer readable recording medium as claimed in claim 27, wherein a brightness threshold value is obtained according to a brightness calculated from color signals of each of the pixels by said class classification function, and a group of pixels each having the brightness lower than said brightness threshold value are classified into said first class, and a group of pixels each having the brightness higher than said brightness threshold value are classified into said second class by said class classification function.

32. The computer readable recording medium as claimed in claim 31, wherein the tone correction is performed by said tone correction function according to a tone conversion curve based on an average value and a standard deviation of brightness in a group of pixels classified into said first class in one of said blocks including a maximum number of pixels classified into said second class, and on an average value and a standard deviation of brightness in a group of said pixels classified into said second class, according to a result of said classifying by said class classification function in each of said blocks.

33. The computer readable recording medium as claimed in claim 31, wherein the tone correction is performed by said tone correction function according to a tone conversion curve based on an average value and a standard deviation of brightness in a group of pixels classified into said first class in one of said blocks including said group of said pixels classified into said first class and a group of pixels classified into said second class, the groups having a maximum difference in average brightness therebetween, and on an average value and a standard deviation of brightness in said group of said pixels classified into said second class, according to a result of said classifying by said class classification function in each of said blocks.

34. The computer readable recording medium as claimed in claim 27, wherein an average color of a group of pixels classified into said first class in one of said blocks including a maximum number of pixels classified into said second class is estimated as the black character color by said black-character-color/ground-color estimation function, and an average color of a group of said pixels classified into said second class is estimated as the ground color by said black-character-color/ground-color estimation function, according to a result of said classifying by said class classification function in each of said blocks.

35. The computer readable recording medium as claimed in claim 27, wherein an average color of a group of pixels classified into said first class in one of said blocks including said group of said pixels classified into said first class and a group of pixels classified into said second class, the groups having a maximum difference in average brightness therebetween, is estimated as the black character color by said black-character-color/ground-color estimation function, and an average color of said group of said pixels classified into said second class is estimated as the ground color by said black-character-color/ground-color estimation function, according to a result of said classifying by said class classification function in each of said blocks.

36. The computer readable recording medium as claimed in claim 27, wherein the image processing program further causes said computer to perform a low-resolution image generation function of generating a low-resolution image having a lower resolution than said original image,
wherein the feature value is calculated from said low-resolution image by said feature-value calculation function, and
said character area is extracted from said low-resolution image by said character area extraction function.

37. A computer readable recording medium storing an image processing program interpreted by a computer so as to cause said computer to perform:
a low-resolution image generation function of generating a low resolution image from the original image, said low resolution image having a lower resolution than said original image;
a feature-value calculation function of calculating a feature value with respect to an original image that is a digital image;
a character area extraction function of performing a local adaptive binarization of each color component by performing a local adaptive threshold processing and an expansion processing to the low-resolution image so as to perform an extractive detection of a character area and extracting a character area from said original image according to said feature value;
a block division function of dividing said original image into blocks;
a class classification function of classifying pixels belonging to said character area in each of said blocks into a first class and a second class according to colors;
a background color estimation function of estimating a background color on said original image according to the pixels belonging to said character area being classified into said first class and said second class;
a background area specification function of specifying a background area on said original image according to the estimated background color; and a tone correction function of performing a tone correction to said original image by replacing a color of the specified background area with the estimated background color.

38. The computer readable recording medium as claimed in claim 37, wherein an average value and a standard deviation of color signals in a window set around each pixel are calculated by said feature-value calculation function, and a pixel and pixels around said pixel are extracted as said character area by said character area extraction function according to a color signal value of said pixel in relation to a threshold value based on said average value and said standard deviation.

39. The computer readable recording medium as claimed in claim 37, wherein an edge amount of each pixel is calculated by said feature-value calculation function, and a pixel having the edge amount equal to or larger than a predetermined threshold value, and pixels around said pixel, are extracted as said character area by said character area extraction function.

40. The computer readable recording medium as claimed in claim 37, wherein an edge amount of each pixel, and an average value and a standard deviation of color signals in a window set around each pixel are calculated by said feature-value calculation function, and a pixel having the edge amount equal to or larger than a predetermined threshold value, and pixels around said pixel, are extracted as said character area by said character area extraction function, and a pixel and pixels around said pixel are extracted as said character area by said character area extraction function according to a color signal value of said pixel in relation to a threshold value based on said average value and said standard deviation.

41. The computer readable recording medium as claimed in claim 37, wherein a brightness threshold value is obtained according to a brightness calculated from color signals of each of the pixels by said class classification function, and a group of pixels each having the brightness lower than said brightness threshold value are classified into said first class, and a group of pixels each having the brightness higher than said brightness threshold value are classified into said second class by said class classification function.

42. The computer readable recording medium as claimed in claim 37, wherein an average color of a group of pixels classified into said second class in one of said blocks including a maximum number of said pixels classified into said second class is estimated as the background color by said background color estimation function, according to a result of said classifying by said class classification function in each of said blocks.

43. The computer readable recording medium as claimed in claim 37, wherein an average color of a group of pixels classified into said second class in one of said blocks including a group of pixels classified into said first class and said group of said pixels classified into said second class, the groups having a maximum difference in average brightness therebetween, is estimated as the background color by said background color estimation function, according to a result of said classifying by said class classification function in each of said blocks.

44. The computer readable recording medium as claimed in claim 37, wherein the image processing program further causes said computer to perform a low-resolution image generation function of generating a low-resolution image having a lower resolution than said original image, wherein the feature value is calculated from said low-resolution image by said feature-value calculation function, and said character area is extracted from said low-resolution image by said character area extraction function.

45. A computer readable recording medium storing an image processing program interpreted by a computer so as to cause said computer to perform:

a low-resolution image generation function of generating a low resolution image from the original image, said low resolution image having a lower resolution than said original image;

a feature-value calculation function of calculating a feature value with respect to an original image that is a digital image;

a character area extraction function of performing a local adaptive binarization of each color component by performing a local adaptive threshold processing and an expansion processing to the low-resolution image so as to perform an extractive detection of a character area and extracting a character area from said original image according to said feature value;

a block division function of dividing said original image into blocks;

a class classification function of classifying pixels belonging to said character area in each of said blocks into a first class and a second class according to colors;

a background color estimation function of estimating a background color on said original image according to the pixels belonging to said character area being classified into said first class and said second class;

a background area specification function of specifying a background area on said original image according to the estimated background color; and a tone correction function of performing a tone correction to said original image by replacing a color of the specified background area with a white color.

46. The computer readable recording medium as claimed in claim 45, wherein an average value and a standard deviation of color signals in a window set around each pixel are calculated by said feature-value calculation function, and a pixel and pixels around said pixel are extracted as said character area by said character area extraction function according to a color signal value of said pixel in relation to a threshold value based on said average value and said standard deviation.

47. The computer readable recording medium as claimed in claim 45, wherein an edge amount of each pixel is calculated by said feature-value calculation function, and a pixel having the edge amount equal to or larger than a predetermined threshold value, and pixels around said pixel, are extracted as said character area by said character area extraction function.

48. The computer readable recording medium as claimed in claim 45, wherein an edge amount of each pixel, and an average value and a standard deviation of color signals in a window set around each pixel are calculated by said feature-value calculation function, and a pixel having the edge amount equal to or larger than a predetermined threshold value, and pixels around said pixel, are extracted as said character area by said character area extraction function, and a pixel and pixels around said pixel are extracted as said character area by said character area extraction function according to a color signal value of said pixel in relation to a threshold value based on said average value and said standard deviation.

49. The computer readable recording medium as claimed in claim 45, wherein a brightness threshold value is obtained according to a brightness calculated from color signals of each of the pixels by said class classification function, and a group of pixels each having the brightness lower than said brightness threshold value are classified into said first class, and a group of pixels each having the brightness higher than said brightness threshold value are classified into said second class by said class classification function.

50. The computer readable recording medium as claimed in claim 45, wherein an average color of a group of pixels classified into said second class in one of said blocks including a maximum number of said pixels classified into said second class is estimated as the background color by said background color estimation function, according to a result of said classifying by said class classification function in each of said blocks.

51. The computer readable recording medium as claimed in claim 45, wherein an average color of a group of pixels classified into said second class in one of said blocks including a group of pixels classified into said first class and said group of said pixels classified into said second class, the groups having a maximum difference in average brightness therebetween, is estimated as the background color by said background color estimation function, according to a result of said classifying by said class classification function in each of said blocks.

52. The computer readable recording medium as claimed in claim 45, wherein the image processing program further causes said computer to perform a low-resolution image generation function of generating a low-resolution image having a lower resolution than said original image, wherein the feature value is calculated from said low-resolution image by said feature-value calculation function, and said character area is extracted from said low-resolution image by said character area extraction function.

* * * * *

UNITED STATES PATENT AND TRADEMARK OFFICE
CERTIFICATE OF CORRECTION

PATENT NO. : 7,330,600 B2  
APPLICATION NO. : 10/649901  
DATED : February 12, 2008  
INVENTOR(S) : Hirobumi Nishida Page 1 of 1

It is certified that error appears in the above-identified patent and that said Letters Patent is hereby corrected as shown below:

In the Title Page:

Item (56): Foreign Patent Documents "JP 2002-117400 12/1994" should read --JP 2002-117400 04/2002--.

Signed and Sealed this

Eighth Day of July, 2008

JON W. DUDAS  
*Director of the United States Patent and Trademark Office*